US011256271B2

(12) United States Patent
Blake et al.

(10) Patent No.: US 11,256,271 B2
(45) Date of Patent: *Feb. 22, 2022

(54) ANTICIPATORY DISPATCH OF UAVS TO PRE-STAGING LOCATIONS

(71) Applicant: Wing Aviation LLC, Mountain View, CA (US)

(72) Inventors: Jesse Blake, Sunnyvale, CA (US); James Schmalzried, San Jose, CA (US); Scott Velez, Mountain View, CA (US); Andre Prager, Sunnyvale, CA (US); Eric Teller, Palo Alto, CA (US); Matthew Nubbe, Santa Clara, CA (US)

(73) Assignee: Wing Aviation LLC, Mountain View, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/930,054

(22) Filed: May 12, 2020

(65) Prior Publication Data

US 2020/0278702 A1 Sep. 3, 2020

Related U.S. Application Data

(63) Continuation of application No. 15/851,693, filed on Dec. 21, 2017, now Pat. No. 10,691,142.

(51) Int. Cl.
*G05D 1/10* (2006.01)
*B64C 39/02* (2006.01)
(Continued)

(52) U.S. Cl.
CPC ........... *G05D 1/104* (2013.01); *B64C 39/024* (2013.01); *G05D 1/0094* (2013.01);
(Continued)

(58) Field of Classification Search
CPC .... G05D 1/104; G05D 1/0094; B64C 39/024; B64C 2201/128; B64C 2201/141;
(Continued)

(56) References Cited

U.S. PATENT DOCUMENTS 6,056,237 A 5/2000 Woodland
6,567,044 B2 5/2003 Carroll
(Continued)

FOREIGN PATENT DOCUMENTS

WO WO-2015160672 A1 * 10/2015 ............. G06Q 10/08
WO WO-2017190026 A2 * 11/2017 ............. G08G 5/025

OTHER PUBLICATIONS

International Bureau, International Preliminary Report on Patentability dated Jul. 2, 2020, issued in connection with International Patent Application No. PCT/US2018/067390 filed on Dec. 21, 2018, 9 pages.

(Continued)

*Primary Examiner* — Calvin Cheung
(74) *Attorney, Agent, or Firm* — McDonnell Boehnen Hulbert & Berghoff LLP

(57) ABSTRACT

An example method involves determining an expected demand level for a first type of a plurality of types of transport tasks for unmanned aerial vehicles (UAVs), the first type of transport tasks associated with a first payload type. Each of the UAVs is physically reconfigurable between at least a first and a second configuration corresponding to the first payload type and a second payload type, respectively. The method also involves determining based on the expected demand level for the first type of transport tasks, (i) a first number of UAVs having the first configuration and (ii) a second number of UAVs having the second configuration. The method further involves, at or near a time corresponding to the expected demand level, providing one or more UAVs (Continued)

to perform the transport tasks, including at least the first number of UAVs.

20 Claims, 16 Drawing Sheets

(51) Int. Cl.
| | | |
|---|---|---|
| | *G05D 1/00* | (2006.01) |
| | *G06Q 50/30* | (2012.01) |
| | *G06Q 10/06* | (2012.01) |
| | *G06Q 10/08* | (2012.01) |

(52) U.S. Cl.
CPC ..... *G06Q 10/06315* (2013.01); *G06Q 10/083* (2013.01); *G06Q 50/30* (2013.01); *B64C 2201/128* (2013.01); *B64C 2201/141* (2013.01); *B64C 2201/146* (2013.01)

(58) Field of Classification Search
CPC ........ B64C 2201/146; G06Q 10/06315; G06Q 10/083; G06Q 50/30
See application file for complete search history.

(56) References Cited

U.S. PATENT DOCUMENTS

| | | | |
|---|---|---|---|
| 6,817,573 | B2 | 11/2004 | Harrison et al. |
| 6,965,816 | B2 | 11/2005 | Walker |
| 7,574,193 | B2 | 8/2009 | Hulkkonen et al. |
| 7,813,888 | B2 | 10/2010 | Vian et al. |
| 7,877,785 | B2 | 1/2011 | Selignan |
| 8,028,952 | B2 | 10/2011 | Umes, Sr. |
| 8,615,473 | B2 | 12/2013 | Spiegel et al. |
| 9,384,668 | B2 | 7/2016 | Raptopoulos et al. |
| 9,387,928 | B1 | 7/2016 | Gentry et al. |
| 9,536,216 | B1 * | 1/2017 | Lisso ............... B29C 65/50 |
| 9,678,507 | B1 | 6/2017 | Douglas et al. |
| 9,718,564 | B1 | 8/2017 | Beckman et al. |
| 9,881,022 | B2 | 1/2018 | Ubhi et al. |
| 10,552,773 | B1 | 2/2020 | Shah et al. |
| 2003/0033179 | A1 | 2/2003 | Katz et al. |
| 2006/0229996 | A1 | 10/2006 | Keithley |
| 2007/0049251 | A1 | 3/2007 | Mock et al. |
| 2008/0085732 | A1 | 4/2008 | Mizuide et al. |
| 2010/0084513 | A1 | 4/2010 | Gariepy et al. |
| 2010/0114790 | A1 | 5/2010 | Strimling et al. |
| 2010/0256839 | A1 | 10/2010 | Fitzpatrick |
| 2010/0280699 | A1 | 11/2010 | Bageshwar et al. |
| 2011/0084162 | A1 | 4/2011 | Goosen et al. |
| 2011/0128372 | A1 | 6/2011 | Malecki et al. |
| 2011/0130636 | A1 | 6/2011 | Daniel et al. |
| 2011/0246274 | A1 | 10/2011 | Mesaros |
| 2011/0267241 | A1 | 11/2011 | Grimm et al. |
| 2011/0281679 | A1 | 11/2011 | Larrabee et al. |
| 2011/0315806 | A1 | 12/2011 | Piasecki et al. |
| 2012/0080556 | A1 | 4/2012 | Root, Jr. |
| 2012/0152654 | A1 | 6/2012 | Marcus |
| 2012/0265590 | A1 | 10/2012 | Mesaros |
| 2014/0032034 | A1 | 1/2014 | Raptopoulos et al. |
| 2014/0222248 | A1 | 8/2014 | Levien et al. |
| 2015/0081343 | A1 | 3/2015 | Streebin |
| 2015/0323932 | A1 | 11/2015 | Paduano et al. |
| 2015/0379874 | A1 | 12/2015 | Ubhi et al. |
| 2016/0028471 | A1 | 1/2016 | Boss et al. |
| 2016/0185466 | A1 | 6/2016 | Dreano, Jr. |
| 2016/0207627 | A1 | 7/2016 | Hoareau et al. |
| 2016/0235236 | A1 | 8/2016 | Byers et al. |
| 2016/0292403 | A1 | 10/2016 | Gong et al. |
| 2016/0292798 | A1 | 10/2016 | Berry et al. |
| 2016/0306355 | A1 | 10/2016 | Gordon et al. |
| 2016/0328669 | A1 | 11/2016 | Droege |
| 2016/0335593 | A1 | 11/2016 | Clarke et al. |
| 2016/0357183 | A1 | 12/2016 | Shaw |
| 2017/0011340 | A1 | 1/2017 | Gabbai |
| 2017/0090484 | A1 | 3/2017 | Obaidi |
| 2017/0116566 | A1 | 4/2017 | Walton |
| 2017/0147975 | A1 | 5/2017 | Natarajan et al. |
| 2017/0154536 | A1 | 6/2017 | Kreiner et al. |
| 2017/0249847 | A1 | 8/2017 | Marueli |
| 2017/0255198 | A1 | 9/2017 | Rodriguez |
| 2017/0267347 | A1 | 9/2017 | Rinaldi et al. |
| 2017/0175413 | A1 | 10/2017 | Curlander et al. |
| 2017/0286892 | A1 | 10/2017 | Studnicka |
| 2017/0320572 | A1 | 11/2017 | High et al. |
| 2017/0323257 | A1 | 11/2017 | Cheatham, III et al. |
| 2017/0334561 | A1 | 11/2017 | Sopper et al. |
| 2017/0337827 | A1 | 11/2017 | Chambers et al. |
| 2017/0353947 | A1 | 12/2017 | Ang et al. |
| 2018/0090014 | A1 | 3/2018 | Kline et al. |
| 2018/0137454 | A1 | 5/2018 | Kulkarni et al. |
| 2018/0141682 | A1 | 5/2018 | Blake et al. |
| 2018/0158020 | A1 | 6/2018 | Khasis |
| 2018/0186473 | A1 | 7/2018 | Erickson et al. |
| 2018/0218454 | A1 | 8/2018 | Simon et al. |
| 2018/0260769 | A1 | 9/2018 | Ahmed et al. |
| 2018/0293898 | A1 | 10/2018 | Redmann et al. |
| 2018/0315148 | A1 | 11/2018 | Luo et al. |
| 2018/0336510 | A1 | 11/2018 | Dacosta et al. |
| 2018/0356239 | A1 | 12/2018 | Marco |
| 2019/0012636 | A1 | 1/2019 | Simon et al. |
| 2019/0064796 | A1 | 2/2019 | Shaw |
| 2019/0114564 | A1 | 4/2019 | Ferguson et al. |
| 2019/0130770 | A1 | 5/2019 | Di Benedetto et al. |
| 2019/0193856 | A1 | 6/2019 | Prager et al. |
| 2019/0193952 | A1 | 6/2019 | Zevenbergen et al. |
| 2019/0196512 | A1 | 6/2019 | Blake et al. |
| 2019/0197643 | A1 | 6/2019 | Cochran et al. |
| 2019/0204992 | A1 | 7/2019 | Bowden et al. |
| 2019/0278897 | A1 | 9/2019 | Zhang et al. |
| 2019/0325467 | A1 | 10/2019 | Perry et al. |
| 2020/0005205 | A1 | 1/2020 | Tsur et al. |
| 2020/0005226 | A1 | 1/2020 | Sikka et al. |
| 2020/0082315 | A1 | 3/2020 | Crapis |
| 2020/0250600 | A1 | 8/2020 | Gupta et al. |
| 2020/0250616 | A1 | 8/2020 | Streebin |
| 2020/0250737 | A1 | 8/2020 | Wallace et al. |

OTHER PUBLICATIONS

International Bureau, International Preliminary Report on Patentability dated Jul. 2, 2020, issued in connection with International Patent Application No. PCT/US2018/063276 filed on Nov. 30, 2018, 10 pages.
Bone et al., "Unmanned Aerial Vehicles: Background and Issues for Congress," Report for Congress, Congressional Research Service, The Library of Congress, Apr. 25, 2003, 53 pages.
Google Inside AdWords, https://adwords.googleblog.com/2009/03/Introduction-to-ad-auction.html, Dec. 22, 2017, 4 pages.
International Searching Authority, International Search Report and Written Opinion dated Feb. 27, 2019, issued in connection with International Application No. PCT/US2018/063276, filed on Nov. 30, 2018, 12 pages.
International Searching Authority, International Search Report and Written Opinion dated Apr. 24, 2019, issued in connection with International Patent Application No. PCT/US2018/067390, filed on Dec. 21, 2018, 12 pages.
Lum, et al., "Telesurgery via Unmanned Aerial Vehicle (UAV) with a Field Deployable Surgical Robot," Medicine Meets Virtual Reality 15, Feb. 2007, pp. 313-315, Long Beach, California.
Nguyen et al., "Situation Identification by Unmanned Aerial Vehicle," Institute of Mathematics, Warsaw University, 2001, pp. 49-56.

\* cited by examiner

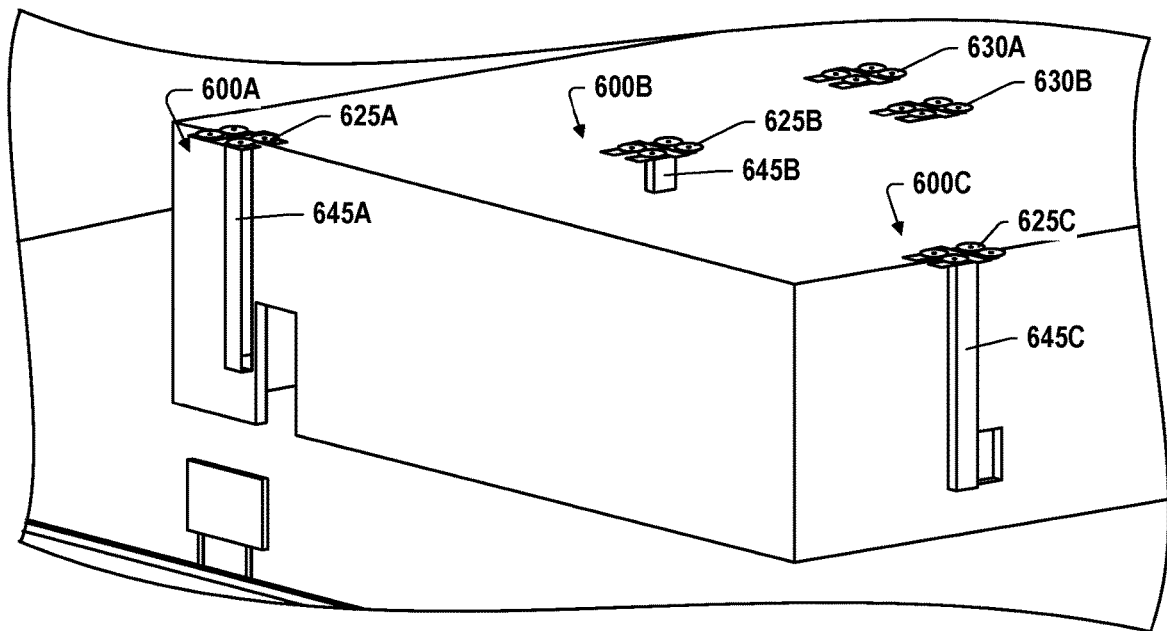
Figure 6A
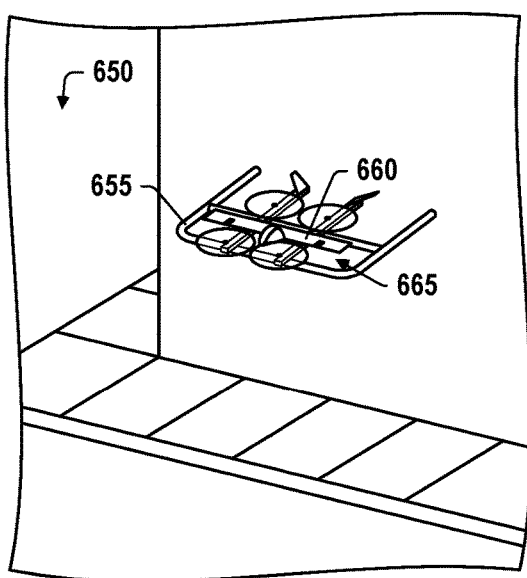 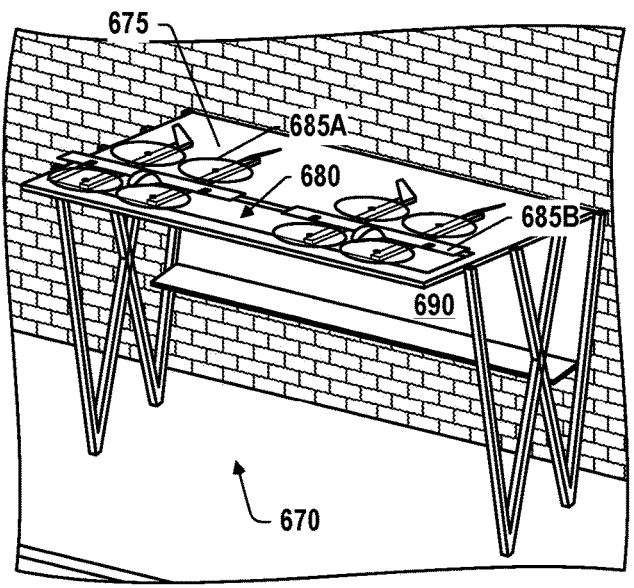
Figure 6B	Figure 6C

ANTICIPATORY DISPATCH OF UAVS TO PRE-STAGING LOCATIONS

CROSS-REFERENCE TO RELATED APPLICATION

This application is a continuation of and claims priority to U.S. patent application Ser. No. 15/851,693, filed Dec. 21, 2017, and entitled "Anticipatory Dispatch of UAVs to Pre-staging Locations," which is hereby incorporated by reference as if fully set forth in this description.

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so concurrently. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter unmanned aerial vehicles (UAVs), among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible. Furthermore, unmanned vehicles may require physical landing structure(s) to pick up or drop off payload, to charge batteries, or to complete other tasks.

SUMMARY

In example embodiments, unmanned aerial vehicles (UAVs) may be used to deliver items throughout a geographic area. The UAVs may be operated by an aerial transport service provider (ATSP), which is an entity separate from the providers of the items being delivered. The UAVs may be stored at a UAV nest location different from the locations of the delivery item providers, and may be dynamically assigned to the item providers and/or to specific transport tasks (e.g., specific deliveries).

The ATSP may predict the level of demand for the UAVs within a future window of time, and, based on this prediction, may adapt its UAV fleet to meet the expected demand. Further, demand forecasting may be implemented to predict and/or estimate upcoming demand for different types of UAV transport tasks, in different geographic areas and/or locations. Accordingly, UAVs may be physically pre-configured with, for example, different batteries, motors, wings, rotors, payload hooks, and payload containers to be able to transport the different types of items that the item providers are likely to request to have transported. Further, the UAVs may be dispatched to different pre-staging locations throughout the geographic area in anticipation of the respective levels of demand for different types of transport tasks at or near to each pre-staging location. As a result, whenever a delivery item provider requests a UAV to deliver an item on the item provider's behalf, the UAV may be dispatched from the nearest pre-staging location. Thus, the item provider will not have to wait for the UAV to travel the flight leg from the UAV nest to the item provider's location, and transport of the item may be initiated with reduced or minimal delay.

In a first embodiment, a method is provided that includes determining, by a control system, an expected demand level corresponding to a demand for a first type of a plurality of types of transport tasks for unmanned aerial vehicles (UAVs). The first type of transport tasks is associated with a first payload type of a plurality of payload types. Each of the UAVs is physically reconfigurable between at least a first configuration corresponding to the first payload type and a second configuration corresponding to a second payload type of the payload types. The method also includes determining, by the control system, based on the expected demand level for the first type of transport tasks, (i) a first number of UAVs having the first configuration and (ii) a second number of UAVs having the second configuration. The method further includes, at or near a time corresponding to the expected demand level, providing one or more UAVs to perform the transport tasks. The one or more UAVs include at least the first number of UAVs with the first configuration.

In a second embodiment, a system is provided that includes a plurality of unmanned aerial vehicles (UAVs). Each of the plurality of UAVs is physically reconfigurable between at least a first configuration and a second configuration. The first configuration corresponds to a first payload type of a plurality of payload types and the second configuration corresponds to a second payload type of a plurality of payload types. The system also includes a control system configured to determine an expected demand level corresponding to a demand for a first type of a plurality of types of transport tasks for the plurality of UAVs. The first types of transport tasks is associated with the first payload type. The control system is also configured to determine, based on the expected demand level for the first type of transport tasks, (i) a first number of UAVs having the first configuration and (ii) a second number of UAVs having the second configuration. The control system is further configured to, at or near a time corresponding to the expected demand level, provide one or more UAVs to perform the transport tasks. The one or more UAVs include at least the first number of UAVs with the first configuration.

In a third embodiment, a non-transitory computer readable storage medium is provided having stored thereon instructions that, when executed by a computing device, cause the computing device to perform operations. The operations include determining an expected demand level corresponding to a demand for a first type of a plurality of types of transport tasks for unmanned aerial vehicles (UAVs). The first type of transport tasks is associated with a first payload type of a plurality of payload types. Each of the UAVs is physically reconfigurable between at least a first configuration corresponding to the first payload type and a second configuration corresponding to a second payload type of the payload types. The operations also include determining, based on the expected demand level for the first type of transport tasks, (i) a first number of UAVs having the first configuration and (ii) a second number of UAVs having the second configuration. The operations further include, at or near a time corresponding to the expected demand level, providing one or more UAVs to perform the transport tasks. The one or more UAVs include at least the first number of UAVs with the first configuration.

In a fourth embodiment, a system is provided that includes means for determining an expected demand level corresponding to a demand for a first type of a plurality of types of transport tasks for unmanned aerial vehicles (UAVs). The first type of transport tasks is associated with a first payload type of a plurality of payload types. Each of the UAVs is physically reconfigurable between at least a first configuration corresponding to the first payload type and a second configuration corresponding to a second payload type of the payload types. The system also includes means for determining, based on the expected demand level for the first type of transport tasks, (i) a first number of UAVs having the first configuration and (ii) a second number of UAVs having the second configuration. The system further includes means for, at or near a time corresponding to the expected demand level, providing one or more UAVs to perform the transport tasks. The provided one or more UAVs include at least the first number of UAVs with the first configuration.

In a fifth embodiment, a method is provided that includes determining, by a control system and for a geographic area, an expected demand level corresponding to a demand, by item providers in the geographic area, for transport tasks for unmanned aerial vehicles (UAVs). The method also includes determining, by the control system, based on the expected demand level, one or more pre-staging locations within the geographic area at which one or more of the UAVs can land prior to initiating one or more of the transport tasks. The method further includes, before a time corresponding to the expected demand level, dispatching the one or more UAVs to the one or more pre-staging locations.

In a sixth embodiment, a system is provided that includes a plurality of UAVs and a control system configured to determine, for a geographic area, an expected demand level corresponding to a demand, by item providers in the geographic area, for transport tasks for the UAVs. The control system is also configured to determine, based on the expected demand level, one or more pre-staging locations within the geographic area at which one or more of the UAVs can land prior to initiating one or more of the transport tasks. The control system is further configured to, before a time corresponding to the expected demand level, dispatching the one or more UAVs to the one or more pre-staging locations.

In a seventh embodiment, a non-transitory computer readable storage medium is provided having stored thereon instructions that, when executed by a computing device, cause the computing device to perform operations. The operations include determining, for a geographic area, an expected demand level corresponding to a demand, by item providers in the geographic area, for transport tasks for unmanned aerial vehicles (UAVs). The operations also include determining, based on the expected demand level, one or more pre-staging locations within the geographic area at which one or more of the UAVs can land prior to initiating one or more of the transport tasks. The operations further include, before a time corresponding to the expected demand level, dispatching the one or more UAVs to the one or more pre-staging locations.

In an eighth embodiment, system is provided that includes means for determining, for a geographic area, an expected demand level corresponding to a demand, by item providers in the geographic area, for transport tasks for unmanned aerial vehicles (UAVs). The system also includes means for determining, based on the expected demand level, one or more pre-staging locations within the geographic area at which one or more of the UAVs can land prior to initiating one or more of the transport tasks. The system further includes means for, before a time corresponding to the expected demand level, dispatching the one or more UAVs to the one or more pre-staging locations.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6A illustrates landing structures, in accordance with example embodiments.

FIG. 6B illustrates a landing structure, in accordance with example embodiments.

FIG. 6C illustrates a landing structure, in accordance with example embodiments.

DETAILED DESCRIPTION

Figure 1A:
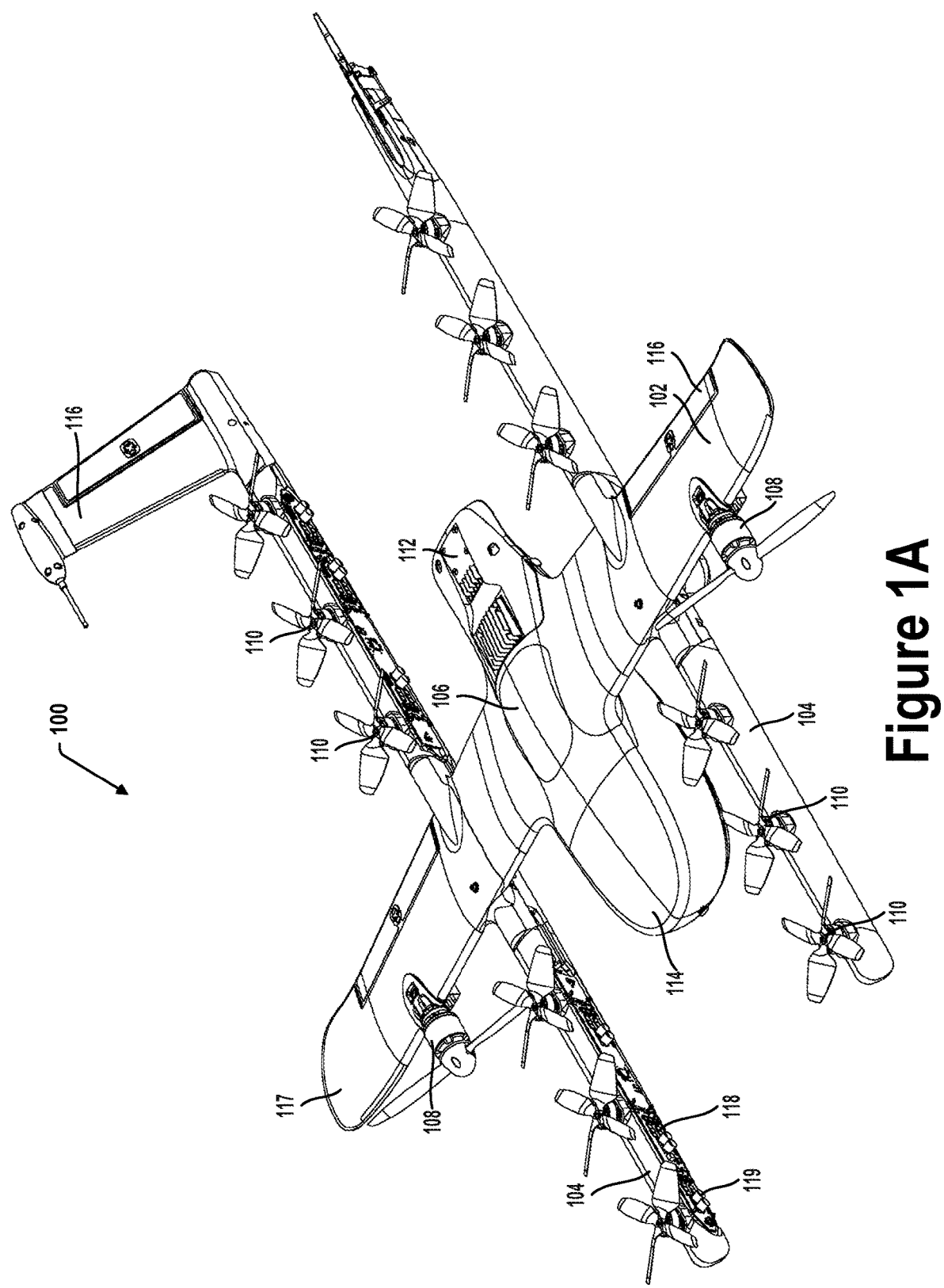
FIG. 1A is an illustration of an unmanned aerial vehicle, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

In some cases, an aerial transport service provider (ATSP), which uses unmanned aerial vehicles (UAVs) to transport items, may be a separate entity from entities that provide the items being transported and interface with the recipients who request delivery of these items. That is, a company that operates a fleet of UAVs configured for delivery may provide delivery services for third-party entities, such as restaurants, clothing stores, grocery stores, and other "brick and mortar" and/or online retailers. These third-party entities may have accounts with the ATSP, via which the third-parties can request and/or purchase UAV transport services from the ATSP. Further, the third-party entities could interface with recipients (e.g., customers) directly, or through computing systems provided by the ATSP.

In order to provide UAV transport services to various item providers in an efficient and flexible manner, the ATSP may dynamically assign different UAVs to transport tasks for different item providers based on demand and/or other factors, rather than permanently assigning each UAV to a particular item provider. Additionally or alternatively, an individual UAV or groups of UAVs may be assigned to a specific item provider for a certain time period, and then re-assigned to another item provider for a subsequent time period. In either case, the UAVs that carry out transport tasks for a given third-party item provider may vary over time.

The dynamic assignment of UAVs to transport tasks for a number of different item providers can help the ATSP to more efficiently utilize a group of UAVs (e.g., by reducing unnecessary UAV downtime), as compared to an arrangement where specific UAVs are permanently assigned to specific item providers. More specifically, to dynamically assign UAVs to transport requests from third-party item providers, the ATSP can dynamically redistribute UAVs amongst a number of UAV nests and/or UAV pre-staging location throughout a service area. Each UAV nest may serve a corresponding geographic area within the service area. A plurality of pre-staging locations may be distributed throughout each geographic area, with some of the pre-staging locations located at or near the locations of the item providers.

With such an arrangement, a delivery flight may involve an additional flight leg to fly from the UAV nest to the item provider's location to pick up the item for transport, before flying to the delivery location, as compared to an arrangement where delivery UAVs are stationed at the source location of the items (such as a distributor or retailer warehouse or a restaurant). While the flight leg between the UAV nest and a pick-up location has associated costs, these costs can be offset by more efficient use of each UAV (e.g., more flights, and less unnecessary ground time, in a given period of time), which in turn can allow for a lesser number of UAVs to be utilized for a given number of transport tasks.

The cost of the flight leg between the UAV nest and the item pick-up location can be further offset by distributing (i.e., "pre-staging") the UAVs from each UAV nest throughout a geographic area according to time-varying levels of demand at various locations or sub-areas within the geographic area. When a UAV is requested, rather than dispatching a UAV from the nest, a UAV may be dispatched from a nearby pre-staging location, thus reducing or minimizing the delay due to the extra flight leg. In some cases, the UAV may be pre-staged at the location from which the item is expected to be picked up, thus eliminating the extra flight leg entirely.

The UAVs may be pre-staged before the demand level is predicted to arise, thus allowing demand to be met proactively, rather than reactively, as would be the case if UAVs were dispatched from the nest only when the UAVs were actually requested. A UAV planned to serve a particular item provider may be dispatched to a staging location with sufficient time to arrive at the staging location before the item provider requests the UAV for service. This dispatch time may be dictated by the distance between the UAV nest and the item provider's location, as well as the speed with which the UAV can traverse this distance. In some instances, when a pre-staging location includes a charging pad for the UAV, the dispatch time may also depend on a length of time needed to recharge batteries of the UAV to a level sufficient to perform the transport task.

UAV pre-staging may involve dispatching the UAVs to physical features of the environment or purpose-built landing structures distributed throughout the geographic area by the ATSP or another entity. The physical features may generally include rooftops, lampposts, trees, or cell towers, that is, locations that are generally out of reach of people on the ground and which can accommodate landing, parking, and take-off by a UAV. Similarly, the purpose-built landing structures may be configured to accommodate landing, parking, and take-off by the UAV, and may be placed in locations deemed as secure for the UAV to stay on (e.g., out of reach of pedestrians, or in a supervised location). Further, the purpose-built landing structures may provide the UAVs with maintenance capabilities, such as battery charging and system diagnostics, while the UAVs perch thereon.

Each pre-staging location may be located within close proximity (e.g., within a threshold distance, such as several meters) to at least one item provider so as to arrive at the location of the at least one item provider in under a maximum response time (i.e., to maintain a minimum quality of service). For example, the purpose-built landing structures may be installed on the roof or walls of a building associated with an item provider that uses the ATSP's UAV delivery services, allowing the item provider quick access to the UAVs' services. In another example, environmental landing structures may include trees, rooftops, or lampposts nearby the item provider. UAVs may be dispatched to pre-staging locations within close proximity of item providers that are expected to request UAV service. Thus, the extent to which each pre-staging location is used (e.g., the fraction of time during which it is occupied by a UAV) may vary over time as demand for transport tasks fluctuates. This approach may allow the UAVs to quickly respond to requests for UAV service, and may improve utilization of the UAV fleet.

In addition to pre-staging empty UAVs near item providers in anticipation of the item providers requesting the UAVs for transport tasks, loaded UAVs may also be pre-staged near item recipients in anticipation of the item recipients ordering particular payload items. The ATSP, the item provider, or the two working together may predict what item a customer is likely to order. The ATSP may dispatch a UAV to pick up the item predicted to be ordered, and may pre-stage the UAV near the customer. When the customer places the order, the item may be delivered to the customer from the pre-staging location, thus eliminating most or all of the customer's wait time. In some instances, the customer may be able to pay extra for delivery of the pre-staged item and for avoiding this wait time.

Additionally, the UAVs may be reconfigured between different physical configurations based on the anticipated level of demand and the types of payload items predicted to be requested to be delivered. That is, the UAV fleet may be proactively adapted over time to handle variations in the properties of the payloads (e.g., heavy or light, fragile or sturdy, hot or cold). Each UAV may be outfitted with various combinations of different wings, rotors, motors, sensors, batteries, winches, tethers, hooks, and item containers, among other possibilities. The UAV components may be hot-swappable, that is, may be changed without stopping or pausing operation of the ATSP. The UAVs may be reconfigured at the the UAV nest, before being dispatched to the pre-staging locations. Accordingly, each pre-staged UAV may be adapted to transport a corresponding range of item types, over a corresponding range, and with a corresponding speed, among other parameters dictated by the UAV's physical configuration.

Such UAV pre-configuration may allow the UAV fleet to serve a wide range of item providers. During mealtimes (e.g., 11 am-1 pm), for example, a large portion of the UAVs may be physically pre-configured for food delivery. Since food delivery generally involves transporting relatively small payloads, the UAVs may be outfitted with smaller motors, wings, and/or rotors that use less power and are sufficient to lift the food payloads. The UAVs may also be outfitted with insulated payload containers to maintain temperature of the food being transported. The remaining UAVs may be pre-configured to transport other types of payloads, such as packages containing merchandise, by being outfitted with larger motors, wings, and.or rotors to accommodate the larger average size of a merchandise package. On the other hand, during off-mealtime hours, a large portion of the UAVs may be physically pre-configured for package delivery, with the remaining UAVs assigned to tasks such as food delivery.

The ATSP may provide UAVs for transport tasks at varying rates, depending on where the UAVs are pre-staged and what physical configuration they have. A pre-staged UAV available to initiate a transport task immediately may be more expensive than a UAV that has to fly to the item provider from the UAV nest before initiating the task. Similarly, it may be less expensive to pre-order a UAV for a transport task rather than request the UAV at the time it is needed, since the pre-order allows the ATSP to more accurately plan the demand for its UAV fleet. In another example, a large UAV that is configured to transport heavy payloads and therefore uses more power may be more expensive than a smaller UAV configured to transport light payloads and which therefore uses less power.

II. Illustrative Unmanned Vehicles

Herein, the terms "unmanned aerial system" and "UAV" refer to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
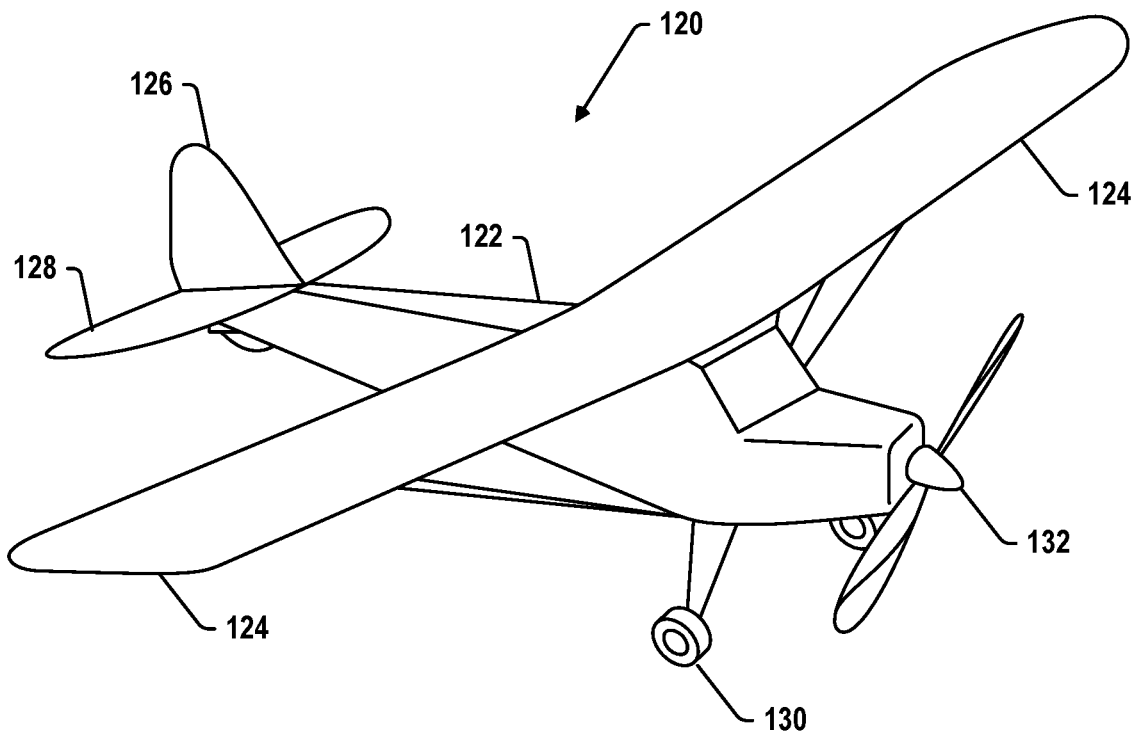
FIG. 1B is a simplified illustration of an unmanned aerial vehicle, in accordance with example embodiments.

Similarly, FIG. 1B shows another example fixed-wing UAV 120. Fixed-wing UAV 120 includes fuselage 122, two wings 124 with an airfoil-shaped cross section to provide lift for UAV 120, vertical stabilizer 126 (or fin) to stabilize the plane's yaw (turn left or right), horizontal stabilizer 128 (also referred to as an elevator or tailplane) to stabilize pitch (tilt up or down), landing gear 130, and propulsion unit 132, which can include a motor, shaft, and propeller.

Figure 1C:
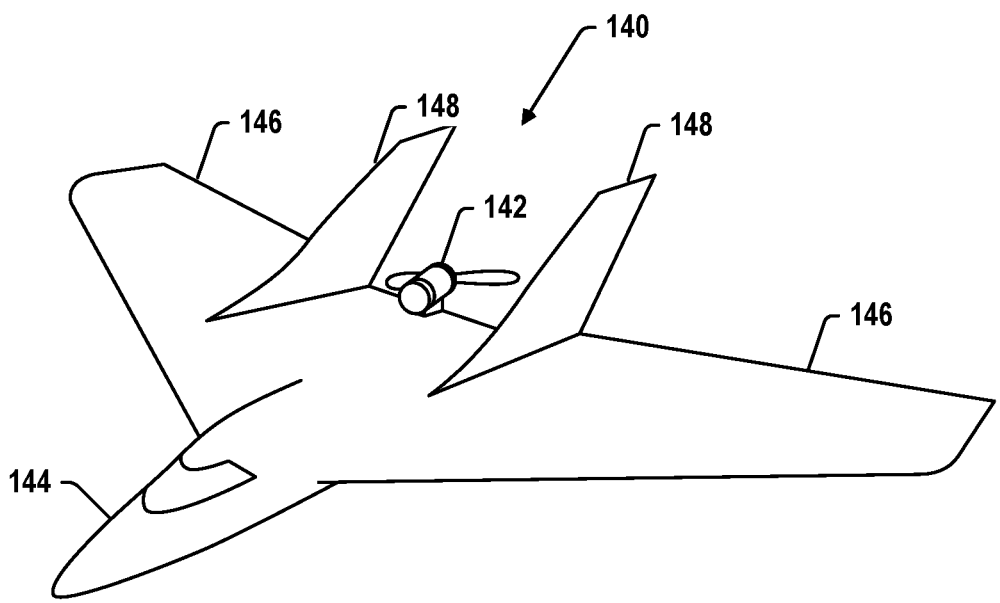
FIG. 1C is a simplified illustration of an unmanned aerial vehicle, in accordance with example embodiments.

FIG. 1C shows an example of UAV 140 with a propeller in a pusher configuration. The term "pusher" refers to the fact that propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including fuselage 144, two wings 146, vertical stabilizers 148, and propulsion unit 142, which can include a motor, shaft, and propeller.

Figure 1D:
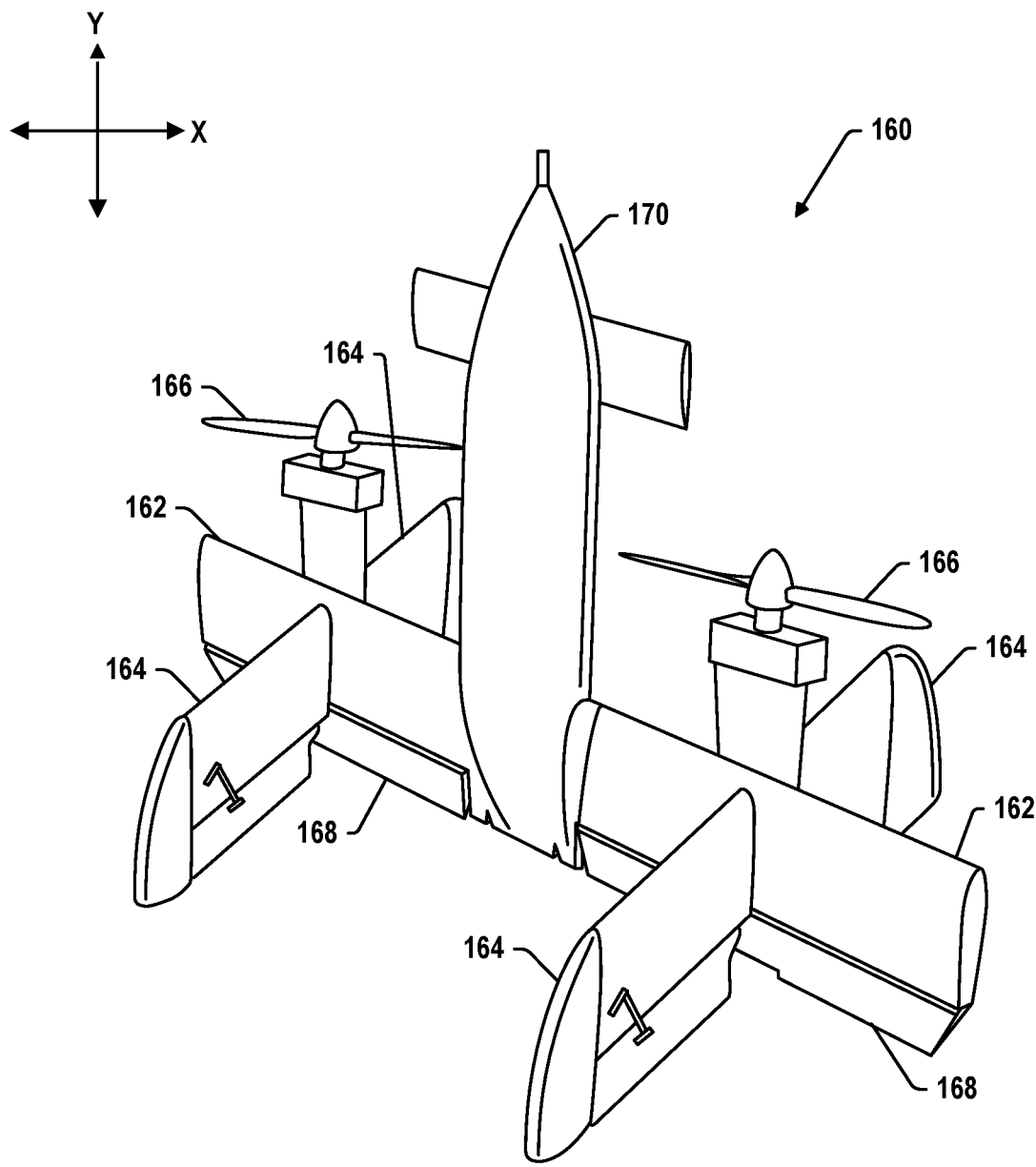
FIG. 1D is a simplified illustration of an unmanned aerial vehicle, in accordance with example embodiments.

FIG. 1D shows an example tail-sitter UAV 160. In the illustrated example, tail-sitter UAV 160 has fixed wings 162 to provide lift and allow UAV 160 to glide horizontally (e.g., along the x-axis, in a position that is approximately perpendicular to the position shown in FIG. 1D). However, fixed wings 162 also allow tail-sitter UAV 160 to take off and land vertically on its own.

For example, at a launch site, tail-sitter UAV 160 may be positioned vertically (as shown) with fins 164 and/or wings 162 resting on the ground and stabilizing UAV 160 in the vertical position. Tail-sitter UAV 160 may then take off by operating propellers 166 to generate an upward thrust (e.g., a thrust that is generally along the y-axis). Once at a suitable altitude, tail-sitter UAV 160 may use flaps 168 to reorient itself in a horizontal position, such that fuselage 170 is closer to being aligned with the x-axis than the y-axis. Positioned horizontally, propellers 166 may provide forward thrust so that tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
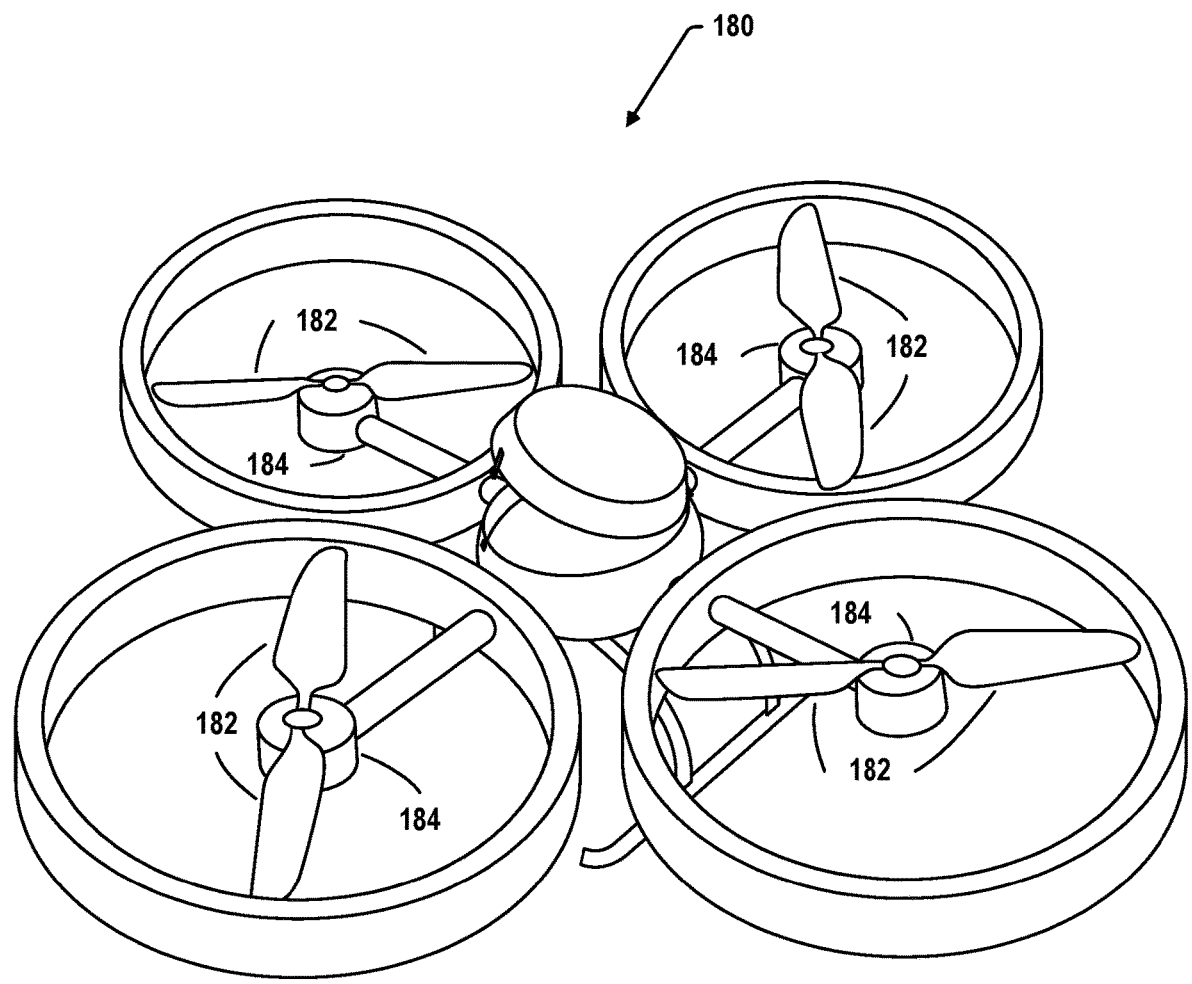
FIG. 1E is a simplified illustration of an unmanned aerial vehicle, in accordance with example embodiments.

As noted above, some embodiments may involve other types of UAVs, in addition to or in the alternative to fixed-wing UAVs. For instance, FIG. 1E shows an example rotorcraft 180 that is commonly referred to as a multicopter. Multicopter 180 may also be referred to as a quadcopter, as it includes four rotors 182. It should be understood that example embodiments may involve a rotorcraft with more or fewer rotors than multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 180 in greater detail, the four rotors 182 provide propulsion and maneuverability for multicopter 180. More specifically, each rotor 182 includes blades that are attached to motor 184. Configured as such, rotors 182 may allow multicopter 180 to take off and land vertically, to maneuver in any direction, and/or to hover. Further, the pitch of the blades may be adjusted as a group and/or differentially, and may allow multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Illustrative UAV Components

Figure 2:
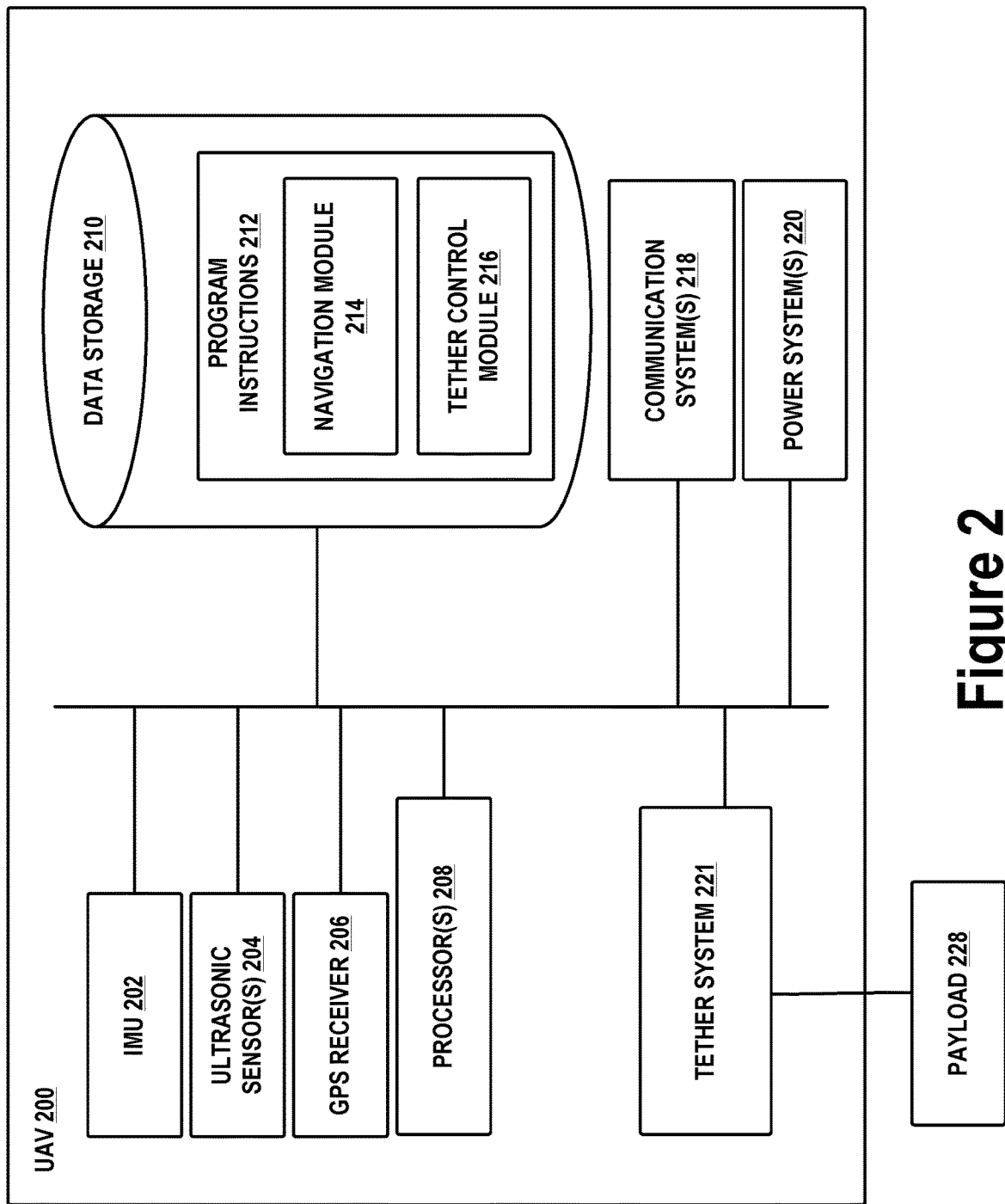
FIG. 2 is a simplified block diagram illustrating components of an unmanned aerial system, in accordance with example embodiments.

FIG. 2 is a simplified block diagram illustrating components of UAV 200, according to an example embodiment. UAV 200 may take the form of, or be similar in form to, one of UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include inertial measurement unit (IMU) 202, ultrasonic sensor(s) 204, and GPS 206, among other possible sensors and sensing systems.

In the illustrated embodiment, UAV 200 also includes one or more processor(s) 208. Processor(s) 208 may be general-purpose processor(s) or special purpose processor(s) (e.g., digital signal processor(s), application specific integrated circuit(s), etc.). Processor(s) 208 can be configured to execute computer-readable program instructions 212 that are stored in data storage 210 and are executable to provide the functionality of a UAV described herein.

Data storage 210 may include or take the form of one or more computer-readable storage media that can be read or accessed by processor(s) 208. The one or more computer-readable storage media can include volatile and/or non-volatile storage components, such as optical, magnetic, organic or other memory or disc storage, which can be integrated in whole or in part with at least one of processor(s) 208. In some embodiments, data storage 210 can be implemented using a single physical device (e.g., one optical, magnetic, organic or other memory or disc storage unit), while in other embodiments, data storage 210 can be implemented using two or more physical devices.

As noted, data storage 210 can include computer-readable program instructions 212 and perhaps additional data, such as diagnostic data of UAV 200. As such, data storage 210 may include program instructions 212 to perform or facilitate some or all of the UAV functionality described herein. For instance, in the illustrated embodiment, program instructions 212 include navigation module 214 and tether control module 216.

A. Sensors

In an illustrative embodiment, IMU 202 may include both an accelerometer and a gyroscope, which may be used together to determine an orientation of UAV 200. In particular, the accelerometer can measure the orientation of the vehicle with respect to earth, while the gyroscope measures the rate of rotation around an axis. IMUs are commercially available in low-cost, low-power packages. For instance, IMU 202 may take the form of or include a miniaturized MicroElectroMechanical System (MEMS) or a NanoElectroMechanical System (NEMS). Other types of IMUs may also be utilized.

IMU 202 may include other sensors, in addition to accelerometers and gyroscopes, which may help to better determine position and/or help to increase autonomy of UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include GPS receiver 206. GPS receiver 206 may be configured to provide data that is typical of well-known GPS systems, such as the GPS coordinates of UAV 200. Such GPS data may be utilized by UAV 200 for various functions. As such, the UAV may use GPS receiver 206 to help navigate to a caller's location, as indicated, at least in part, by the GPS coordinates provided by their mobile device. Other examples are also possible.

B. Navigation and Location Determination

Navigation module 214 may provide functionality that allows UAV 200 to, e.g., move about its environment and reach a desired location. To do so, navigation module 214 may control the altitude and/or direction of flight by controlling the mechanical features of the UAV that affect flight (e.g., its rudder(s), elevator(s), aileron(s), and/or the speed of its propeller(s)).

In order to navigate UAV 200 to a target location (e.g., a delivery location), navigation module 214 may implement various navigation techniques, such as map-based navigation and localization-based navigation, for instance. With map-based navigation, UAV 200 may be provided with a map of its environment, which may then be used to navigate to a particular location on the map. With localization-based navigation, UAV 200 may be capable of navigating in an unknown environment using localization. Localization-based navigation may involve UAV 200 building its own map of its environment and calculating its position within the map and/or the position of objects in the environment. For example, as UAV 200 moves throughout its environment, UAV 200 may continuously use localization to update its map of the environment. This continuous mapping process may be referred to as simultaneous localization and mapping (SLAM). Other navigation techniques may also be utilized.

In some embodiments, navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, navigation module 214 and/or other components and systems of UAV 200 may be configured for "localization" to more precisely navigate to the scene of a target location. More specifically, it may be desirable in certain situations for a UAV to be within a threshold distance of the target location where payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, UAV 200 may navigate to the general area of a target destination where payload 228 is being delivered using waypoints and/or map-based navigation. The UAV may then switch to a mode in which it utilizes a localization process to locate and travel to a more specific location. For instance, if UAV 200 is to deliver a payload to a user's home, UAV 200 may need to be substantially close to the target location in order to avoid delivery of the payload to undesired areas (e.g., onto a roof, into a pool, onto a neighbor's property, etc.). However, a GPS signal may only get UAV 200 so far (e.g., within a block of the user's home). A more precise location-determination technique may then be used to find the specific target location.

Various types of location-determination techniques may be used to accomplish localization of the target delivery location once UAV 200 has navigated to the general area of the target delivery location. For instance, UAV 200 may be equipped with one or more sensory systems, such as, for example, ultrasonic sensors 204, infrared sensors (not shown), and/or other sensors, which may provide input that navigation module 214 utilizes to navigate autonomously or semi-autonomously to the specific target location.

As another example, once UAV 200 reaches the general area of the target delivery location (or of a moving subject such as a person or their mobile device), UAV 200 may switch to a "fly-by-wire" mode where it is controlled, at least in part, by a remote operator, who can navigate UAV 200 to the specific target location. To this end, sensory data from UAV 200 may be sent to the remote operator to assist them in navigating UAV 200 to the specific location.

As yet another example, UAV 200 may include a module that is able to signal to a passer-by for assistance in either reaching the specific target delivery location; for example, UAV 200 may display a visual message requesting such assistance in a graphic display, play an audio message or tone through speakers to indicate the need for such assistance, among other possibilities. Such a visual or audio message might indicate that assistance is needed in delivering UAV 200 to a particular person or a particular location, and might provide information to assist the passer-by in delivering UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once UAV 200 arrives at the general area of a target delivery location, UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, UAV 200 may be configured to navigate by "sourcing" such directional signals—in other words, by determining where the signal is strongest and navigating accordingly. As another example, a mobile device can emit a frequency, either in the human range or outside the human range, and UAV 200 can listen for that frequency and navigate accordingly. As a related example, if UAV 200 is listening for spoken commands, then UAV 200 could utilize spoken statements, such as "I'm over here!" to source the specific location of the person requesting delivery of a payload.

In an alternative arrangement, a navigation module may be implemented at a remote computing device, which communicates wirelessly with UAV 200. The remote computing device may receive data indicating the operational state of UAV 200, sensor data from UAV 200 that allows it to assess the environmental conditions being experienced by UAV 200, and/or location information for UAV 200. Provided with such information, the remote computing device may determine altitudinal and/or directional adjustments that should be made by UAV 200 and/or may determine how UAV 200 should adjust its mechanical features (e.g., its rudder(s), elevator(s), aileron(s), and/or the speed of its propeller(s)) in order to effectuate such movements. The remote computing system may then communicate such adjustments to UAV 200 so it can move in the determined manner.

C. Communication Systems

In a further aspect, UAV 200 includes one or more communication systems 218. Communications system(s) 218 may include one or more wireless interfaces and/or one or more wireline interfaces, which allow UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, UAV 200 may include communication system(s) 218 that allow for both short-range communication and long-range communication. For example, UAV 200 may be configured for short-range communications using Bluetooth and for long-range communications under a CDMA protocol. In such an embodiment, UAV 200 may be configured to function as a "hot spot;" or in other words, as a gateway or proxy between a remote support device and one or more data networks, such as a cellular network and/or the Internet. Configured as such, UAV 200 may facilitate data communications that the remote support device would otherwise be unable to perform by itself.

For example, UAV 200 may provide a WiFi connection to a remote device, and serve as a proxy or gateway to a cellular service provider's data network, which the UAV might connect to under an LTE or a 3G protocol, for instance. UAV 200 could also serve as a proxy or gateway to a high-altitude balloon network, a satellite network, or a combination of these networks, among others, which a remote device might not be able to otherwise access.

D. Power Systems

In a further aspect, UAV 200 may include power system(s) 220. Power system(s) 220 may include one or more batteries for providing power to UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

In a further aspect, power system(s) 220 of UAV 200 may include a power interface for electronically coupling to an external AC power source, and an AC/DC converter coupled to the power interface and operable to convert alternating current to direct current that charges the UAV's battery or batteries. For instance, the power interface may include a power jack or other electric coupling for connecting to a 110V, 120V, 220V, or 240V AC power source. Such a power system may facilitate a recipient-assisted recharging process, where a recipient can connect the UAV to a standard power source at a delivery location, such as the recipient's home or office. Additionally or alternatively, power system(s) 220 could include a inductive charging interface, such that recipient-assisted recharging can be accomplished wirelessly via an inductive charging system installed or otherwise available at the delivery location.

E. Payload Delivery

UAV 200 may employ various systems and configurations in order to transport and deliver payload 228. In some implementations, payload 228 of UAV 200 may include or take the form of a "package" designed to transport various goods to a target delivery location. For example, UAV 200 can include a compartment, in which an item or items may be transported. Such a package may include one or more food items, purchased goods, medical items, or any other object(s) having a size and weight suitable to be transported between two locations by the UAV. In some embodiments, payload 228 may simply be the one or more items that are being delivered (e.g., without any package housing the items). And, in some embodiments, the items being delivered, the container or package in which the items are transported, and/or other components may all be considered to be part of the payload.

In some embodiments, payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include tether system 221, which may be controlled by tether control module 216 in order to lower payload 228 to the ground while the UAV hovers above. Tether system 221 may include a tether, which is couplable to payload 228 (e.g., a package). The tether may be wound on a spool that is coupled to a motor of the UAV (although passive implementations, without a motor, are also possible). The motor may be a DC motor (e.g., a servo motor) that can be actively controlled by a speed controller, although other motor configurations are possible. In some embodiments, tether control module 216 can control the speed controller to cause the motor to rotate the spool, thereby unwinding or retracting the tether and lowering or raising the payload coupling apparatus. In practice, a speed controller may output a desired operating rate (e.g., a desired RPM) for the spool, which may correspond to the speed at which the tether system should lower the payload towards the ground. The motor may then rotate the spool so that it maintains the desired operating rate (or within some allowable range of operating rates).

In order to control the motor via a speed controller, tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor causes rotation of the spool, a rotary encoder may be used to measure this rotation. In doing so, the rotary encoder may be used to convert a rotary position to an analog or digital electronic signal used by tether control module 216 to determine the amount of rotation of the spool from a fixed reference angle and/or to an analog or digital electronic signal that is representative of a new rotary position, among other options. Other examples are also possible.

In some embodiments, a payload coupling component or apparatus (e.g., a hook or another type of coupling component) can be configured to secure payload 228 while being lowered from the UAV by the tether. The coupling apparatus or component and can be further configured to release payload 228 upon reaching ground level via electrical or electro-mechanical features of the coupling component. The payload coupling component can then be retracted to the UAV by reeling in the tether using the motor.

In some implementations, payload 228 may be passively released once it is lowered to the ground. For example, a payload coupling component may provide a passive release mechanism, such as one or more swing arms adapted to retract into and extend from a housing. An extended swing arm may form a hook on which payload 228 may be attached. Upon lowering the release mechanism and payload 228 to the ground via a tether, a gravitational force as well as a downward inertial force on the release mechanism may cause payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of payload 228 no longer forces the swing arm to extend from the housing. Retracting the swing arm into the housing may reduce the likelihood of the release mechanism snagging payload 228 or other nearby objects when raising the release mechanism toward the UAV upon delivery of payload 228.

In another implementation, a payload coupling component may include a hook feature that passively releases the payload when the payload contacts the ground. For example, the payload coupling component may take the form of or include a hook feature that is sized and shaped to interact with a corresponding attachment feature (e.g., a handle or hole) on a payload taking the form of a container or tote. The hook may be inserted into the handle or hole of the payload container, such that the weight of the payload keeps the payload container secured to the hook feature during flight. However, the hook feature and payload container may be designed such that when the container contacts the ground and is supported from below, the hook feature slides out of the container's attachment feature, thereby passively releasing the payload container. Other passive release configurations are also possible.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, UAV 200 could include an air-bag drop system or a parachute drop system. Alternatively, UAV 200 carrying a payload could simply land on the ground at a delivery location. Other examples are also possible.

In some arrangements, a UAV might not include tether system 221. For example, a UAV could include an internal compartment or bay in which the UAV could hold items during transport. Such a compartment could be configured as a top-loading, side-loading, and/or bottom-loading chamber. The UAV may include electrical and/or mechanical means (e.g., doors) that allow the interior compartment in the UAV to be opened and closed. Accordingly, the UAV may open the compartment in various circumstances, such as: (a) when picking up an item for delivery at an item source location, such that the item can be placed in the UAV for delivery, (b) upon arriving at a delivery location, such that the recipient can place an item for return into the UAV, and/or (c) in other circumstances. Further, it is also contemplated, that other non-tethered mechanisms for securing payload items to a UAV are also possible, such as various fasteners for securing items to the UAV housing, among other possibilities. Yet further, a UAV may include an internal compartment for transporting items and/or other non-tethered mechanisms for securing payload items, in addition or in the alternative to tether system 221.

IV. Illustrative UAV Deployment Systems

Figure 3:
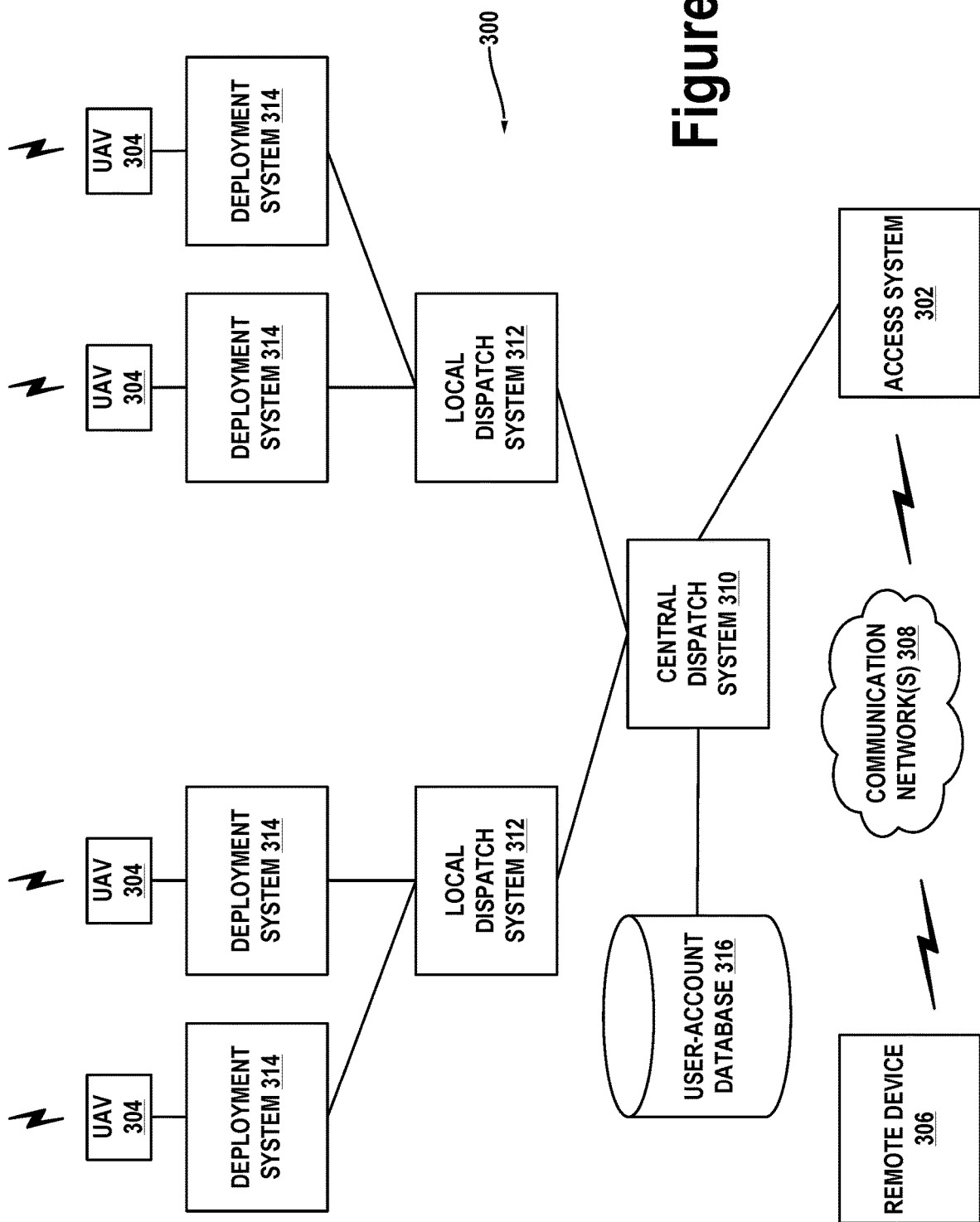
FIG. 3 is a simplified block diagram illustrating a distributed UAV system, in accordance with example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, access system 302 may allow for interaction with, control of, and/or utilization of a network of UAVs 304. In some embodiments, access system 302 may be a computing system that allows for human-controlled dispatch of UAVs 304. As such, the control system may include or otherwise provide a user interface through which a user can access and/or control UAVs 304.

In some embodiments, dispatch of UAVs 304 may additionally or alternatively be accomplished via one or more automated processes. For instance, access system 302 may dispatch one of UAVs 304 to transport a payload to a target location, and the UAV may autonomously navigate to the target location by utilizing various on-board sensors, such as a GPS receiver and/or other various navigational sensors.

Further, access system 302 may provide for remote operation of a UAV. For instance, access system 302 may allow an operator to control the flight of a UAV via its user interface. As a specific example, an operator may use access system 302 to dispatch one of UAVs 304 to a target location. The dispatched UAV may then autonomously navigate to the general area of the target location. At this point, the operator may use access system 302 to take control of the dispatched UAV and navigate the dispatched UAV to the target location (e.g., to a particular person to whom a payload is being transported). Other examples of remote operation of a UAV are also possible.

In an illustrative embodiment, UAVs 304 may take various forms. For example, each of UAVs 304 may be a UAV such as those illustrated in FIG. 1A, 1B, 1C, 1D, 1E, or 2. However, UAV system 300 may also utilize other types of UAVs without departing from the scope of the invention. In some implementations, all of UAVs 304 may be of the same or a similar configuration. However, in other implementations, UAVs 304 may include a number of different types of UAVs. For instance, UAVs 304 may include a number of types of UAVs, with each type of UAV being configured for a different type or types of payload delivery capabilities.

UAV system 300 may further include remote device 306, which may take various forms. Generally, remote device 306 may be any device through which a direct or indirect request to dispatch a UAV can be made. Note that an indirect request may involve any communication that may be responded to by dispatching a UAV, such as requesting a package delivery. In an example embodiment, remote device 306 may be a mobile phone, tablet computer, laptop computer, personal computer, or any network-connected computing device. Further, in some instances, remote device 306 may not be a computing device. As an example, a standard telephone, which allows for communication via plain old telephone service (POTS), may serve as remote device 306. Other types of remote devices are also possible.

Further, remote device 306 may be configured to communicate with access system 302 via one or more types of communication network(s) 308. For example, remote device 306 may communicate with access system 302 (or a human operator of access system 302) by communicating over a POTS network, a cellular network, and/or a data network such as the Internet. Other types of networks may also be utilized.

In some embodiments, remote device 306 may be configured to allow a user to request pick-up of one or more items from a certain source location and/or delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, UAV system 300 may receive location information (e.g., GPS coordinates, etc.) from the user's mobile phone, or any other device on the user's person, such that a UAV can navigate to the user's location (as indicated by their mobile phone).

In some embodiments, a business user (e.g., a restaurant) could utilize one or more remote devices 306 to request that a UAV be dispatched to pick-up one or more items (e.g., a food order) from a source location (e.g., the restaurant's address), and then deliver the one or more items to a target location (e.g., a customer's address). Further, in such embodiments, there may be multiple instances of remote device 306 associated with a common item provider account (e.g., an account used by multiple employees and/or owners of a particular restaurant). Additionally, in such embodiments, remote device 306 may be utilized to send item provider submissions to a transport provider computing system (e.g., central dispatch system 310 and or local dispatch system 312), which each indicate a respective quantitative measure for a given amount of UAV transport service at a given future time. For example, remote device 306 may be utilized to generate and send an item provider submission that specifies a level of desired UAV transport services (e.g., number and/or rate of expected UAV delivery flights), and/or a monetary value corresponding to the item provider's need for UAV transport services, at a particular time or during a particular period of time in the future.

In an illustrative arrangement, central dispatch system 310 may be a server or group of servers, which is configured to receive dispatch messages requests and/or dispatch instructions from access system 302. Such dispatch messages may request or instruct central dispatch system 310 to coordinate the deployment of UAVs to various target locations. Central dispatch system 310 may be further configured to route such requests or instructions to one or more local dispatch systems 312. To provide such functionality, central dispatch system 310 may communicate with access system 302 via a data network, such as the Internet or a private network that is established for communications between access systems and automated dispatch systems.

In the illustrated configuration, central dispatch system 310 may be configured to coordinate the dispatch of UAVs 304 from a number of different local dispatch systems 312. As such, central dispatch system 310 may keep track of which ones of UAVs 304 are located at which ones of local dispatch systems 312, which UAVs 304 are currently available for deployment, and/or which services or operations each of UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when central dispatch system 310 receives a request for UAV-related service (e.g., transport of an item) from access system 302, central dispatch system 310 may select a specific one of UAVs 304 to dispatch. Central dispatch system 310 may accordingly instruct local dispatch system 312 that is associated with the selected UAV to dispatch the selected UAV. Local dispatch system 312 may then operate its associated deployment system 314 to launch the selected UAV. In other cases, central dispatch system 310 may forward a request for a UAV-related service to one of local dispatch systems 312 that is near the location where the support is requested and leave the selection of a particular one of UAVs 304 to local dispatch system 312.

In an example configuration, local dispatch system 312 may be implemented as a computing system at the same location as deployment system(s) 314 that it controls. For example, a particular one of local dispatch system 312 may be implemented by a computing system installed at a building, such as a warehouse, where deployment system(s) 314 and UAV(s) 304 that are associated with the particular one of local dispatch systems 312 are also located. In other embodiments, the particular one of local dispatch systems 312 may be implemented at a location that is remote to its associated deployment system(s) 314 and UAV(s) 304.

Numerous variations on and alternatives to the illustrated configuration of UAV system 300 are possible. For example, in some embodiments, a user of remote device 306 could request delivery of a package directly from central dispatch system 310. To do so, an application may be implemented on remote device 306 that allows the user to provide information regarding a requested delivery, and generate and send a data message to request that UAV system 300 provide the delivery. In such an embodiment, central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to central dispatch system 310, local dispatch system(s) 312, access system 302, and/or deployment system(s) 314 may be combined in a single system, implemented in a more complex system (e.g., having more layers of control), and/or redistributed among central dispatch system 310, local dispatch system(s) 312, access system 302, and/or deployment system(s) 314 in various ways.

Yet further, while each local dispatch system 312 is shown as having two associated deployment systems 314, a given local dispatch system 312 may alternatively have more or fewer associated deployment systems 314. Similarly, while central dispatch system 310 is shown as being in communication with two local dispatch systems 312, central dispatch system 310 may alternatively be in communication with more or fewer local dispatch systems 312.

In a further aspect, deployment systems 314 may take various forms. In some implementations, some or all of deployment systems 314 may be a structure or system that passively facilitates a UAV taking off from a resting position to begin a flight. For example, some or all of deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad could be used for take-off and landing. Additionally or alternatively, a deployment system could include a robotic arm operable to receive an incoming UAV. Deployment system 314 could also include other structures and/or systems to assist and/or facilitate UAV landing processes. Further, structures and/or systems to assist and/or facilitate UAV landing processes may be implemented as separate structures and/or systems, so long as UAVs can move or be moved from a landing structure or system to deployment system 314 for re-deployment.

Deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse). However, local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, UAV system 300 may include or have access to user-account database 316. User-account database 316 may include data for a number of user accounts, and which are each associated with one or more person. For a given user account, user-account database 316 may include data related to or useful in providing UAV-related services. Typically, the user data associated with each user account is optionally provided by an associated user and/or is collected with the associated user's permission.

Further, in some embodiments, a person may be required to register for a user account with UAV system 300, if they wish to be provided with UAV-related services by UAVs 304 from UAV system 300. As such, user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of access system 302 or send a message requesting a UAV-related service to a dispatch system, the phone may be identified via a unique device identification number, and the call or message may then be attributed to the associated user account. Other examples are also possible.

Additionally or alternatively, an item provider that wishes to deliver their products using UAV transport services provided by an ATSP to deliver, can register for an item provider account with UAV system 300. As such, user-account database 316 may include authorization information for a given item provider account (e.g., one or more user name and password combinations), and/or other information that may be used to authorize access to a given item provider account. Alternatively, data for item provider accounts may be kept in a separate database from recipient user accounts. Other data structures and storage configurations for storing such account data are also possible.

Figure 4A:
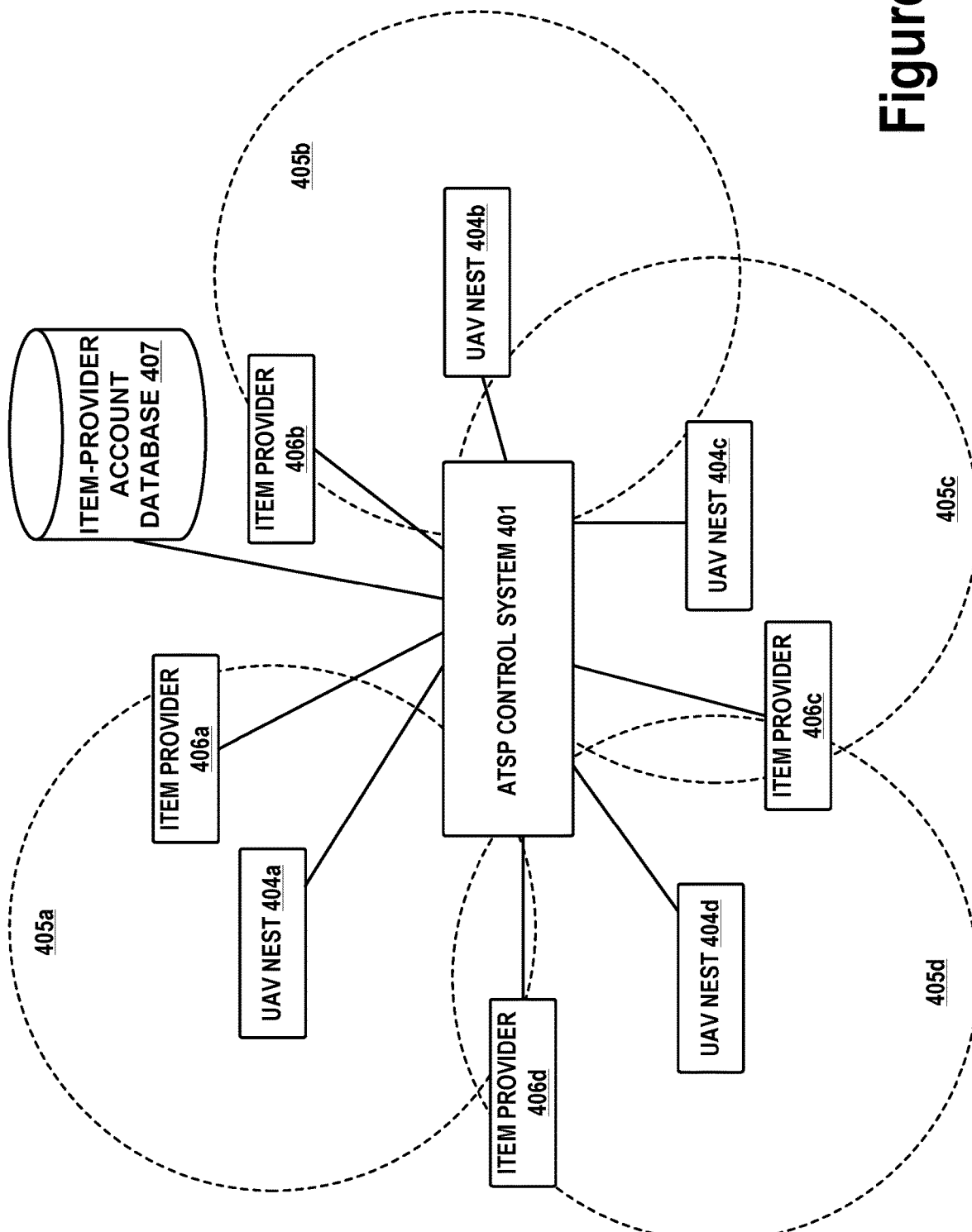
FIG. 4A is a block diagram showing an example arrangement for an aerial transport provider control system, in accordance with example embodiments.

V. UAV Transport Services with Separately Located Item Providers and UAV Hubs FIG. 4A is a block diagram showing an example arrangement for an aerial transport service provider control system 401, which coordinates UAV transport services for a plurality of item providers that are located remotely from the service provider's central UAV dispatch locations (e.g., UAV nests). The ATSP may be a separate entity from the item providers. As shown, ATSP control system 401 may be communicatively coupled to computing or control systems of UAV nests 404a, 404b, 404c, and 404d (i.e., UAV nests 404a-d), and communicatively coupled to computing systems of item providers 406a, 406b, 406c, and 406d (i.e., item providers 406a-d). Such communicative couplings may be implemented using various types of wired and/or wireless communication protocols and networks.

Each of UAV nests 404a-d is a facility where UAVs can be stored for at least a short period of time, and from which UAVs can begin carrying out a UAV transport task (e.g., where UAVs can take off). In some implementations, some or all of the UAV nests may take the form of a local dispatch system and one or more deployment systems, such as those described in reference to FIG. 3 above. Of course, some or all of the UAV nests could also take other forms and/or perform different functions.

Each of the computing systems of item providers 406a-d may be associated with a different item provider account. As such, one or more of the computing systems associated with item providers 406a-d may include one or more computing devices that are authorized to access the corresponding item provider account with the ATSP. Further, the ATSP may store data for item provider accounts in an item provider account database 407.

In practice, one or more of the computing systems of item providers 406a-d may include one or more remote computing devices (e.g., such as one or more remote devices 306 described in reference to FIG. 3), which have logged in to or otherwise been authorized to access the same item provider account (e.g., cell phones, laptops, and/or computing devices of a business's employees). Additionally or alternatively, one or more of the computing systems of item providers 406a-d may be implemented with less of an ad-hoc approach; e.g., with one or more user-interface terminals installed at the item provider's facilities. Other types of item provider computing systems are also possible.

In order to provide UAV transport services to various item providers in an efficient and flexible manner, ATSP control system 401 may dynamically assign different UAVs to transport tasks for different item providers based on demand and/or other factors, rather than permanently assigning each UAV to a particular item provider. As such, the particular UAV or UAVs that carry out transport tasks for a given third-party item provider may vary over time.

The dynamic assignment of UAVs to flights for a number of different item providers can help an ATSP to more efficiently utilize a group of UAVs (e.g., by reducing unnecessary UAV downtime), as compared to an arrangement where specific UAVs are permanently assigned to specific item providers. More specifically, to dynamically assign UAVs to transport requests from third-party item providers, ATSP control system 401 can dynamically redistribute UAVs amongst a number of UAV deployment locations (which may be referred to as, e.g., "hubs" or "nests") through a service area, according to time-varying levels of demand at various locations or sub-areas within the service area.

Each respective UAV nest of UAV nests 404a-d is shown as having associated therewith a corresponding geographic area 405a, 405b, 405c, and 405d, respectively (i.e., geographic areas 405a-d), within which UAVs of the respective UAV nest provide transport services to item providers and/or item recipients. The geographic area served by a given UAV nest may be defined, at least in part, by the flight range(s) of the UAVs that are located at or scheduled to be located at the given UAV nest. In some implementations, the geographic areas 405a-d corresponding to UAV nests 404a-d may each have a fixed size, which does not vary over time. In other implementations, the size of each of geographic areas 405a-d could vary over time based on various factors, such as demand for UAV transport services in the geographic area and/or nearby geographic areas, the number and/or capabilities of UAVs allocated to operate from the corresponding UAV nest, and/or the number and/or characteristics of item providers located near to the UAV nest, among other possibilities.

Additionally or alternatively, the size of each of geographic areas 405a-d could vary on an order-by-order basis, and/or vary by item provider. More specifically, when a transport task involves three or more flight legs (e.g., a flight from the UAV nest to the item provider for pick-up, a flight from the item provider to a delivery location, and a return flight to the UAV nest, as shown in and described with respect to FIG. 4B), there may be two or more flight legs before delivering an item. Thus, the evaluation of whether or not a given item provider is within the geographic service area of a UAV nest for a given transport task may depend on a combination of the distance from the UAV nest to the item pick-up location, the distance from the pick-up location to the delivery location, and the distance from the delivery location to the UAV nest. As a result, a given UAV nest may be able to serve a given item provider for one transport task, but not for another. In this context, it is possible that the notion of a defined "geographic service area" might not be utilized at all. Instead, ATSP control system 401 may simply evaluate whether a UAV transport task can be implemented on a task-by-task basis, given all of the parameters for completion of the task.

Since certain item providers can only be served by (or are better served by) a certain UAV nest or nests, and because demand for UAV transport services can vary between item providers, ATSP control system 401 may, for a given geographic/service area, implement an ongoing process to distribute and redistribute UAVs amongst the UAV nests 404a-d that collectively serve the given area. In particular, ATSP control system 401 may continually, periodically, or from time-to-time evaluate demand and/or other factors for each item provider 406a-d, and determine a respective number of UAVs that are desirable at each of UAV nests 404*a-d*, in order to meet the demand for UAV transport tasks in the corresponding geographic area. Additionally or alternatively, ATSP control system 401 could determine a respective number of UAVs that are desirable at each of UAV nest 404*a-d* such that UAV nests 404*a-d* can collectively meet demand for UAV transport services in the larger area collectively served by the UAV nests 404*a-d*.

Herein, the allocation or assignment of a certain number of UAVs to each of a plurality of UAV nests, as well as to pre-staging locations associated with the nests or located nearby the nests, at a given time may be referred to as the "distribution" of UAVs or the "distribution of UAV capacity" (with "UAV capacity" referring to the fleet or set of UAVs that are available and/or their collective ability to provide transport services at a given time). In order achieve a desired distribution of UAVs at a certain time, ATSP control system 401 can pre-emptively instruct certain UAVs to move between UAV nests and/or between pre-staging locations. By doing so, ATSP control system 401 can redistribute UAV capacity according to location-specific changes in demand.

Figure 4B:
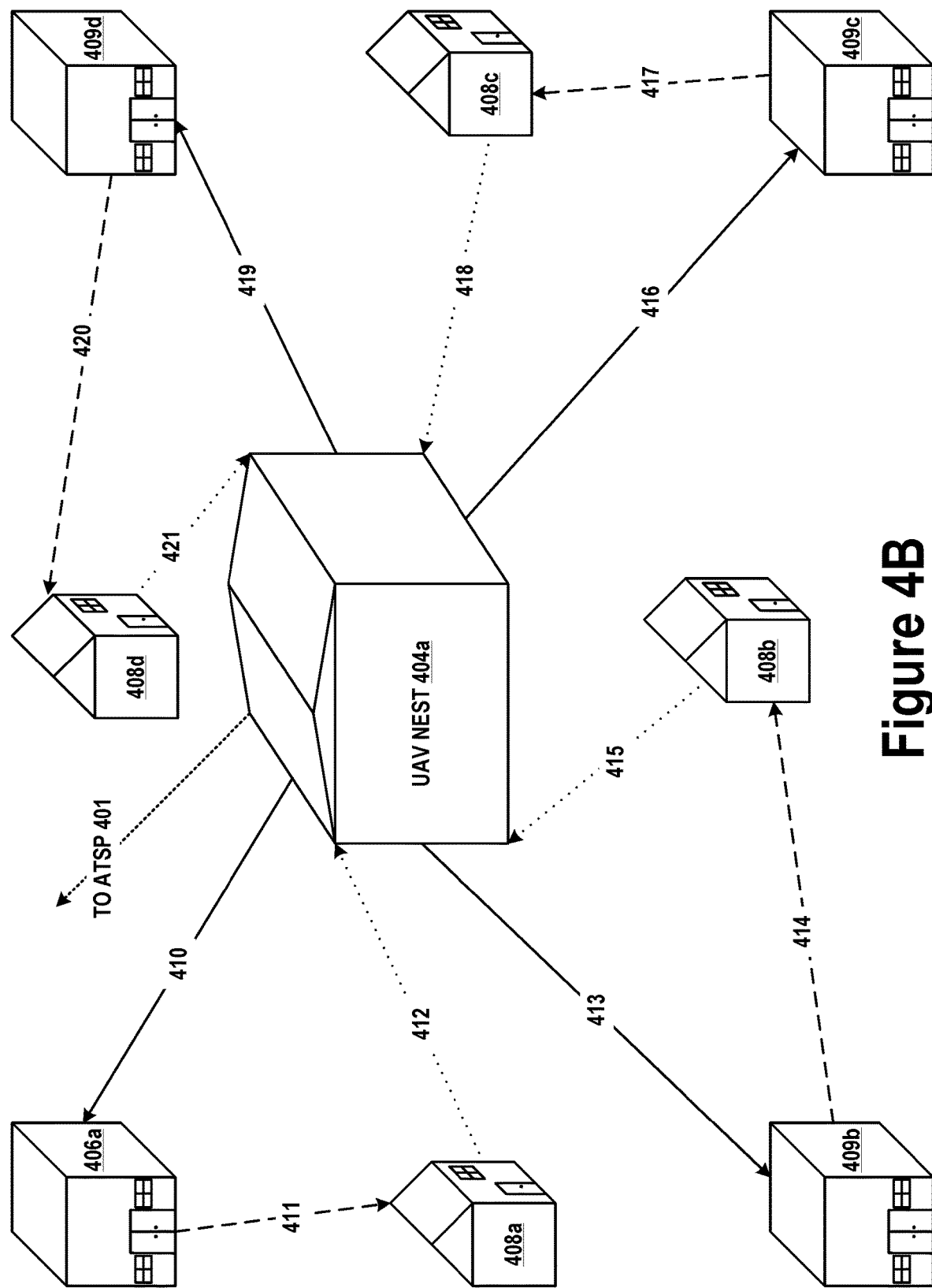
FIG. 4B illustrates a geographic distribution of an aerial transport provider system, in accordance with example embodiments.

FIG. 4B illustrates an example arrangement that may be employed by an ATSP to carry out transport tasks within a geographic area. The shown geographic area may represent geographic area 405*a*, which includes therein UAV nest 404*a*, a plurality of item providers 406*a*, 409*b*, 409*c*, and 409*d* (i.e., item providers 406*a* and 409*b-d*), and a plurality of item recipients 408*a*, 408*b*, 408*c*, and 408*d* (i.e., item recipients 408*a-d*). Item providers 409*b-d* may be other item providers located within geographic area 405*a* (not shown in FIG. 4A) and may each be associated with a corresponding computing system. Geographic areas may contain more or fewer UAV nests, item providers, and item recipients than shown.

Item providers 406*a* and 409*b-d* may include any entities that have items to be delivered to other entities or locations within or beyond the geographic area, including merchants, vendors, dealers, retailers, seller, shippers, and laypersons. Item recipients 408*a-d* may include any entities or locations capable of receiving delivery of an item. Item providers 406*a* and 409*b-d* and item recipients 408*a-d* may each be associated with a geographic location (e.g., GPS coordinates) within the geographic area. In an example embodiment, item providers 406*a* and 409*b-d* may be restaurants or other food vendors within the geographic area, and item recipients 408*a-d* may be locations to which food delivery was ordered from restaurants 406*a* and 409*b-d*.

The ATSP may provide UAVs from nest 404*a* to carry out transport tasks within the geographic area on behalf of item providers 406*a* and 409*b-d*. The transport tasks may involve moving, using a UAV, one or more items from a source location (e.g., a location of an item provider) to a destination or target location (e.g., a location of an item recipient). The UAVs may be stored or reside at UAV nest 404*a* when the UAVs are not performing transport tasks. That is, UAV nest 404*a* may serve as a hub or home location at which the UAVs undergo maintenance, repairs, physical reconfiguration, and battery charging, among other operations. In some embodiments, UAV nest 404*a* may be a building having a fixed location. Alternatively, UAV nest 404*a* may be a vehicle capable of moving through the geographic area and housing a plurality of UAVs.

When item provider 406*a* requests, from the ATSP, a UAV to perform a transport task, the UAV may be dispatched from UAV nest 404*a* and may travel to item provider 406*a*, as indicated by flight leg 410, to pick up the item to be transported. Item provider 406*a* may load the item onto the UAV and may instruct the ATSP that the picked-up item is to be delivered to item recipient 408*a*. Accordingly, the UAV may travel to item recipient 408*a* with the picked-up item, as indicated by flight leg 411. After delivering the item, the UAV may return to UAV nest 404*a*, as indicated by flight leg 412. Alternatively, before returning to UAV nest 404*a*, the UAV may be dispatched to pick up another item from one of item providers 406*a* and 409*b-d* and deliver the item to one of item recipients 408*a-d*.

Similarly, item providers 409*b*, 409*c*, and 409*d* may request, from the ATSP, respective UAVs to perform additional transport tasks, and the ATSP may responsively dispatch the respective UAVs from UAV nest 404*a* to travel to item providers 409*b*, 409*c*, and 409*d*, as indicated by flight legs 413, 416, and 419, respectively, to pick up corresponding items to be transported. Item providers 409*b*, 409*c*, and 409*d* may load the corresponding items onto the respective UAVs and may specify item recipients 408*b*, 408*c*, and 408*d*, respectively, as the delivery destinations. The respective UAVs may then travel to item recipients 408*b*, 408*c*, and 408*d* with the respective items, as indicated by flight legs 414, 417, and 420. After delivering the item, the UAVs may return to UAV nest 404*a*, as indicated by flight legs 415, 418, and 421, or the UAVs may be dispatched to pick up additional items from item providers within the geographic area.

Item providers 406*a* and 409*b-d* may thus offer UAV delivery of their goods and products without having to implement, manage, or maintain any infrastructure associated with the UAVs. Further, item providers 406*a* and 409*b-d* may offer the UAV delivery without having to first move their inventory to a centralized location (e.g., a warehouse) from which the UAVs are dispatched.

With such an arrangement, a delivery flight may involve the additional flight leg to fly from the UAV nest to the item provider's location (e.g., flight legs 410, 413, 416, and 419) to pick up the item or items for transport, before flying to the delivery location, as compared to an arrangement where delivery UAVs are stationed at the source location for items (such as a distributor or retailer warehouse or a restaurant). Thus, because the UAVs are stored at UAV nest 404*a* and not at the locations of item providers 406*a* and 409*b-d*, there may, in some instances, be a delay between when a UAV is requested for a transport task and when the UAV actually arrives to begin the transport task. For example, when item provider 409*b* requests a UAV for a transport task, the UAV may have to traverse flight leg 413 before reaching item provider 409*b*, thereby causing the delay. Traversing flight legs 410, 416, and 419 before arriving at item providers 406*a*, 409*c*, and 409*d*, respectively, may cause a similar delay.

While the flight leg between the UAV nest and a pick-up location has associated costs, these costs can be offset by more efficient use of each UAV (e.g., more flights, and less unnecessary ground time, in a given period of time), which in turn can allow for a lesser number of UAVs to be utilized for a given number of transport tasks. Further, the cost of the flight leg between the UAV nest and the pick-up location may be reduced or eliminated by predictively dispatching UAVs from the UAV nest to pre-staging locations throughout the geographic area based on anticipated demand for UAV transport tasks.

VI. Example Expected Demand

Figure 5:
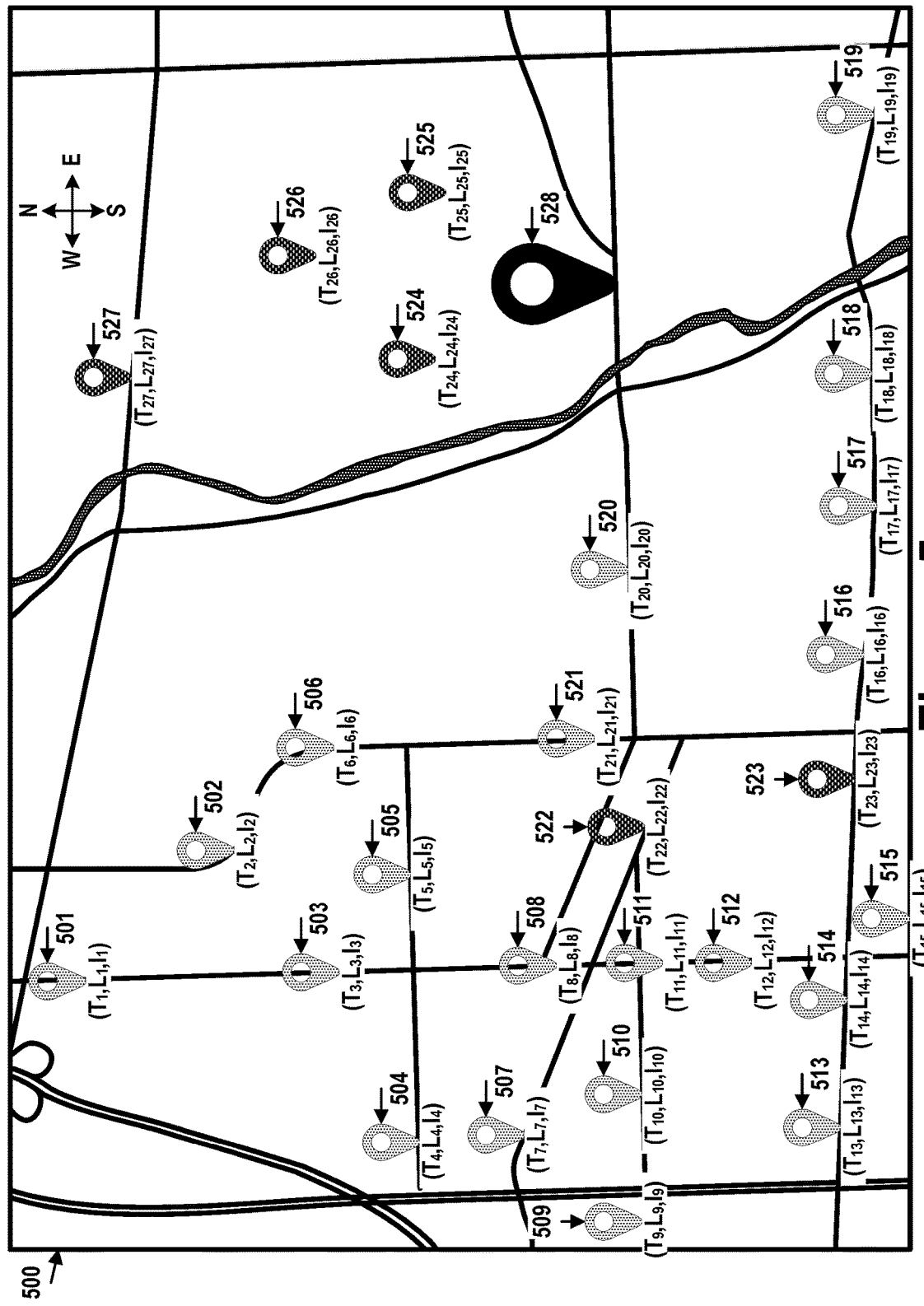
FIG. 5 illustrates demand for UAV transport tasks in a geographic area, in accordance with example embodiments.

FIG. 5 illustrates an example expected demand level for transport tasks within a geographic area. The expected demand level may be used by the ATSP to physically pre-configure UAVs at the UAV nest in preparation for the types of expected transport tasks, and to pre-stage the UAVs throughout the geographic area before the demand level arises. Pre-configuring the UAVs before the expected demand level arises may allow at least a first number of UAVs to be available within the geographic area, where each of the first number of UAVs is capable of transporting the types of expected payload items. Pre-staging, that is, deploying UAVs to item providers before they are needed, may reduce or minimize delays between when a UAV is requested for a transport task and when the UAV arrives to begin performing the requested transport task. That is, pre-staging may reduce the cost of the flight leg between the UAV nest and the pick-up location.

FIG. 5 shows a map of geographic area 500. Within geographic area 500, a plurality of markers 501, 502, 503, 504, 505, 506, 507, 508, 509, 510, 511, 512, 513, 514, 515, 516, 517, 518, 519, 520, 521, 522, 523, 524, 525, 526, and 527 (i.e., markers 501-527) indicate item providers and item recipients expected to request one or more UAVs for transport tasks. Markers 501-521, shaded with a first pattern, may indicate item providers expected to request UAV transport tasks from the ATSP. Markers 522-527, shaded with a second different pattern, may indicate item recipients expected to request UAV transport tasks either directly from the ATSP or by ordering goods from one of the item providers within geographic area 500. Marker 528 indicates a UAV nest of the ATSP, which may be configured to provide UAVs to carry out transport tasks within at least the shown geographic area, and which may correspond UAV nest 404a of FIG. 4B. Notably, most of markers 501-527 are located on the western half of geographic area 500, while the UAV nest is located within the eastern half of geographic area 500. Item providers in the western half may therefore benefit from pre-staging of UAVs throughout the western half of geographic area 500.

Each of markers 501-527 may be associated with at least one corresponding time value (i.e., $T_1$-$T_{27}$) representing a time at which the corresponding item provider or recipient is expected to request a transport task, at least one corresponding location value (i.e., $L_1$-$L_{27}$) representing a location from which and/or to which the corresponding item provider or recipient is expected to request the transport task, and at least one corresponding item type value (i.e., $I_1$-$I_{27}$) representing a type of payload item which the corresponding item provider or recipient is expected to request to have transported. Markers 501-527 may represent expected transport tasks within a predefined future time window (e.g., 10 minutes, 30 minutes, 1 hour, 2, hours, 4, hours, etc.). The types of payload items may be selected from a plurality of different types of payload items that the ATSP is configured to transport. The type of payload item may be a classification based on a plurality of parameters of the payload, including size, weight, shape, fragility, temperature, and value, among other possible payload item properties.

The expected demand level for geographic area 500 may be determined based on historical patterns of demand. In one example, a machine learning algorithm (e.g., an artificial neural network) may be configured, using historical demand data, to determine the expected demand level based on a plurality of inputs including, for example, day of year, day of week, time of day, and weather patterns, among other factors. Further, in some embodiments, the expected demand level may be based on pre-orders, submitted by the item providers, for UAV transport tasks to be carried out in the future. The expected demand level for geographic area 500 may allow the ATSP to prepare the UAVs of the UAV nest represented by marker 528 to handle the anticipated transport tasks.

VII. Example UAV Pre-Staging Operations

Preparing the UAVs of the UAV nest in anticipation of expected demand may involve pre-staging the UAVs throughout geographic area 500. Pre-staging may involve deploying the UAVs from the UAV nest to locations within the geographic area that are within respective threshold distances of expected source locations and/or destination locations associated with the transport tasks expected to be requested. The UAVs may be deployed before requests for transport tasks are received by the ATSP, or, when transport tasks are pre-ordered, before a time for which the UAVs are pre-ordered. Notably, UAVs may be deployed with sufficient lead time to arrive before or near a time when they are needed. Thus, pre-staging may move the UAVs closer to where the UAVs are expected to initiate or carry out the transport tasks, thereby reducing or eliminating the delay resulting from the UAVs having to fly from the UAV nest to the item provider.

The UAVs may be pre-staged at landing structures distributed throughout geographic area 500, or on physical features in geographic area 500 (e.g., roofs, trees, lamp posts, utility poles, etc.). The pre-staging location may thus be configured to have the UAVs land and/or park thereon while waiting to receive requests to carry out transport tasks or before initiating a pre-ordered transport task. In some embodiments, rather than land, the UAVs may hover near locations from which transport tasks are expected to originate. However, by using the pre-staging locations rather than hovering, a UAV may reduce its energy expenditure, thus allowing the UAV additional flight time on its current battery charge. In this way the ATSP may reduce the UAV's wasted energy expenditures in the event that an item provider does not accurately synchronize loading of the payload with arrival of the UAV (i.e., when the item provider causes delay that forces the UAV to hover while waiting for the item provider to load the payload).

FIGS. 6A, 6B, and 6C illustrate example pre-staging locations and structures on which UAVs may land, park, and wait in anticipation of requests for transport tasks. FIG. 6A illustrates multiple landing structures 600A, 600B, and 600C (i.e., 600A-C), installed on a building, on which UAVs 625A, 625B, and 625C may be pre-staged. Each of the landing structures 600A-C may include vertical support structures 645A, 645B, and 645C (i.e., 645A-C), respectively, among other components. The vertical support structures 645A-C may include elevator platforms, conveyor platforms, or other types of transportation apparatuses to lift or move payload items to UAVs 625A-C from users below, and vice versa. FIG. 6A also shows UAVs 630A and 630B pre-staged directly on the roof of the building. UAVs 630A-B may use landing structures 600A-C to pick-up or drop-off payload items after UAVs 625A-C have completed their payload pick-up or drop-off and departed from landing structures 600A-C.

The building may be, for example, a restaurant or a warehouse within geographic area 500. The building may be associated with or may be located nearby an item provider expected to request UAVs for transport tasks. By pre-staging UAVs 625A-C and 630A-B on the building, these UAVs will be ready to, with reduced or minimal delay, begin performing the transport tasks as the transport tasks are requested or ordered by the item provider associated with the building or another nearby item provider. That is, after requesting the transport tasks, the item provider will not have to wait for UAVs 625A-C and 630A-B to make their way to the building from the UAV nest.

UAVs 625A-C may be accessible via multiple locations of the landing structures 600A-C. For example, landing structure 600A may be next to a door to the building, allowing users to drop off or pick up varying payload items as the users enter or exit the building. Landing structure 600B may be installed as part of or through a roof of the building and may thus provide UAV transport services (i.e., pickup/drop-off) to users inside the building, such as in a kitchen. For example, UAV 625B may deliver produce or other ingredients to cooks in a kitchen via vertical support structure 645B by landing on landing structure 600B. Landing structure 600C may be near or coupled to a window of the building, allowing for payload item pick-up/drop-off via the window.

FIG. 6B illustrates landing structure 650, which may include a landing platform 655 and a cavity 665. Within examples, landing platform 655 may be attached to an exterior wall of a building. Landing platform 655 may take up very little space and may be placed almost anywhere on the wall, allowing item providers and item recipients to utilize UAV transport services without interfering with existing structures or requiring much construction. A touchdown area, or the area where UAV 660 contacts and originally lands on landing platform 655, may be angled to guide UAV 660 into a docked position by utilizing gravitational forces. Cavity 665 may be sized to house a payload or have the payload pass therethrough during loading and unloading.

FIG. 6C illustrates yet another landing structure 670, which may include landing platform 675, and cavity 680. Landing platform 675 may be large enough to hold or dock multiple UAVs 685A and 685B at the same time. Cavity 680 may also be large enough such that multiple UAVs 685A and 685B may be loaded or unloaded at the same time. Landing structure 670 may be installed over service window 690 of a merchant's store or restaurant. As such, the merchant or the merchant's customers may have easy access to payloads being dropped off or picked up by UAVs 685A and 685B.

In some embodiments, the landing structures at the pre-staging locations may be equipped with battery chargers. Accordingly, the UAVs' batteries may be charged or topped-off while the UAVs wait at the pre-staging locations to be requested for service. The range over which the UAVs may transport payload items may therefore be extended.

Figure 7:
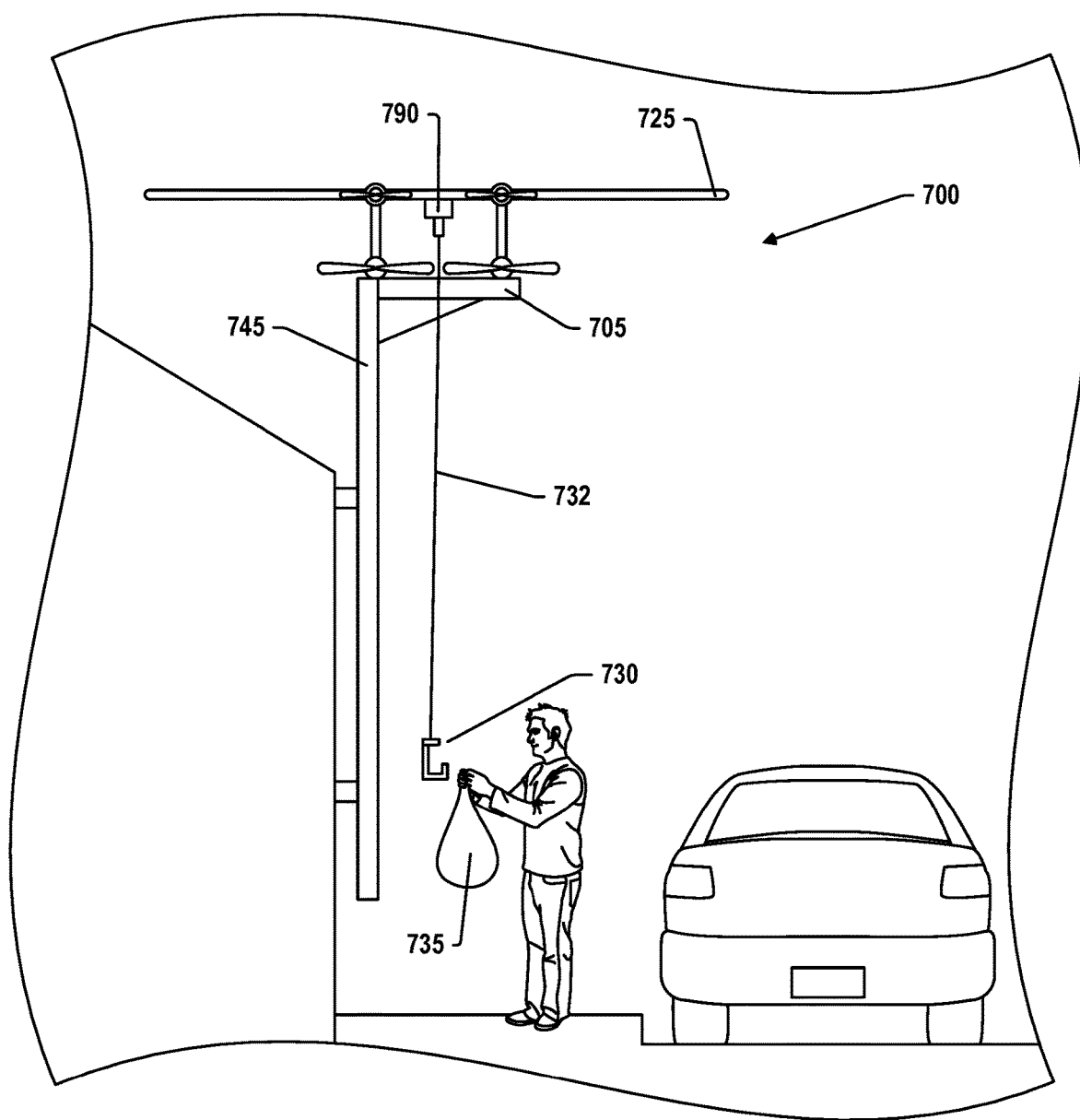
FIG. 7 illustrates a landing structure, in accordance with example embodiments.

FIG. 7 illustrates a landing structure being used to load or unload a payload item from a UAV. In particular, landing structure 700 may include landing platform 705 and vertical support structure 745, which may be attached to an exterior wall of a building. In other embodiments, vertical support structure 745 may be freestanding, or may take the form of existing infrastructure such as, for example, city lamp post or a cell tower. UAV 725 is shown parked on landing structure 700, and includes winch motor 790, tether 732, and payload coupling apparatus 730. Landing structures 600A-C, 650, and 675 may be used in a manner similar to landing structure 700.

UAV 725 may land on landing platform 705 and may unwind tether 732 from a winch system in UAV 725, thus lowering payload coupling apparatus 730 toward a ground level. At the ground level, a user may secure payload 735 to payload coupling apparatus 730 (i.e., during payload item pick-up), or the user may remove payload 735 from payload coupling apparatus 730 (i.e., during payload item drop-off). Payload coupling apparatus 730 may include a hook and payload 735 may be a bag that has a handle which may be placed around the hook of payload coupling apparatus 730, thus securing payload 735 to payload coupling apparatus 730.

In the event of payload item pick-up, after payload 735 is secured, winch motor 790 may wind tether 732 to raise payload 735 and payload coupling apparatus 730 up to landing platform 705, until payload 735 has completely passed through a cavity (not shown) of landing platform 705. In the event of payload item drop-off, after UAV 725 lands on landing platform 705, winch motor 790 may unwind and extend tether 732 vertically down towards the ground, thus lowering payload 735.

Figure 8:
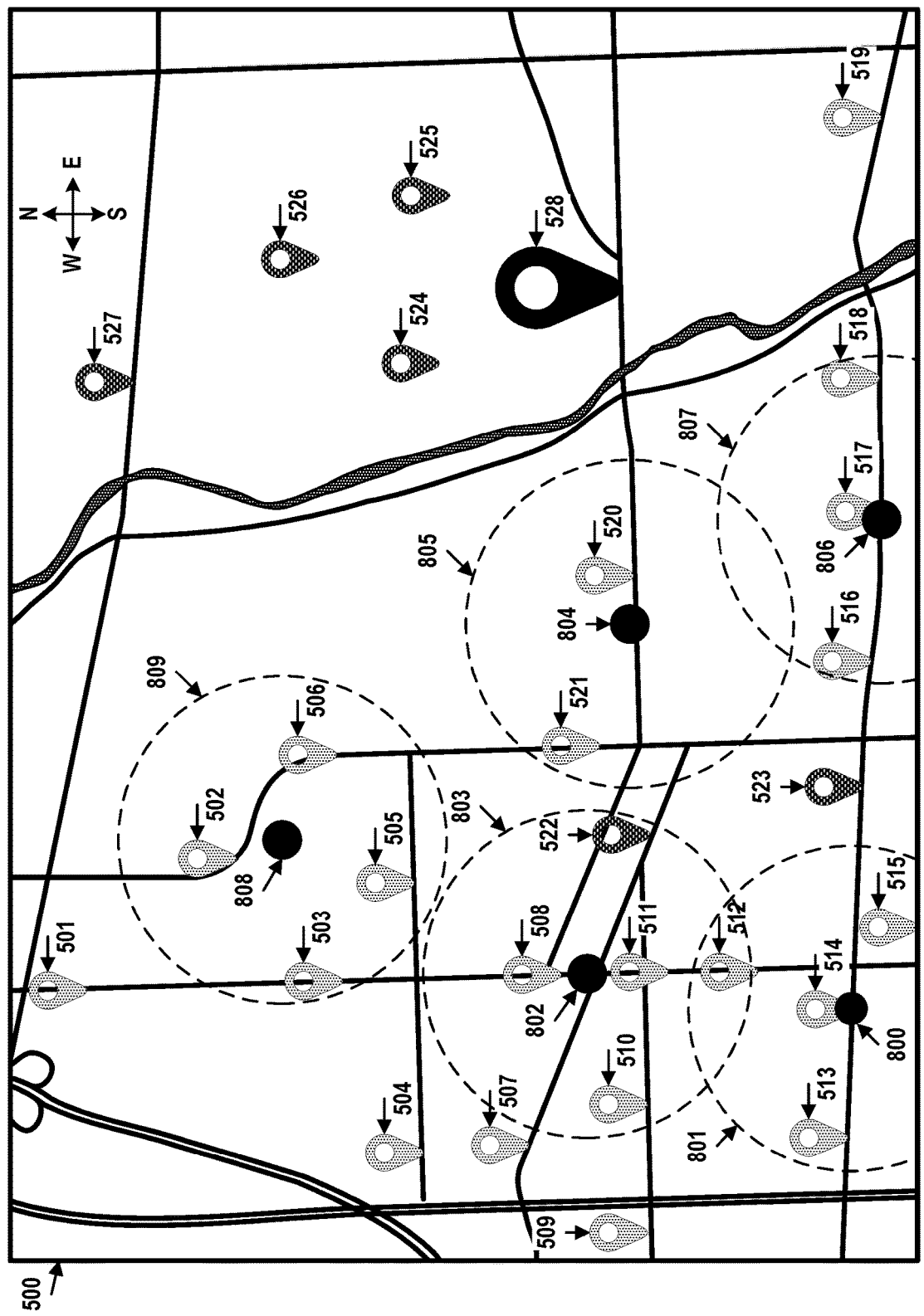
FIG. 8 illustrates pre-staging locations in a geographic area, in accordance with example embodiments.

UAVs of the ATSP may be pre-staged at locations throughout geographic area 500 based on the expected demand level for UAV transport tasks. FIG. 8 illustrates an example distribution of UAVs among pre-staging locations 800, 802, 804, 806, and 808 within geographic area 500. Pre-staging locations may include any combination of environmental features (e.g., trees, lampposts, cell towers, etc.) and purpose-built landing structures such as landing structures 600A-C, 650, 675, and 700. Pre-staging locations 800 and 806, for example, may be landing structures installed on buildings associated with item providers indicated by markers 514 and 517. Pre-staging locations 802, 804, and 808 may be landing structures or environmental features near item providers. Each of pre-staging locations 800, 802, 804, 806, and 808 may contain multiple UAVs.

Additionally, each of pre-staging locations 800, 802, 804, 806, and 808 may be located within a corresponding threshold distance, as illustrated by areas 801, 803, 805, 807, and 809, respectively, of at least one item provider. For example, pre-staging location 800 may include item providers indicated by markers 512, 513, 514, and 515 within the threshold distance thereof, pre-staging location 802 may include item providers indicated by markers 508, 510, 511, and 512, as well as the item recipient indicated by marker 522 within the threshold distance thereof, pre-staging location 804 may include item providers indicated by markers 520 and 521 within the threshold distance thereof, pre-staging location 806 may include item providers indicated by markers 516, 517, and 518 within the threshold distance thereof, and pre-staging location 808 may include item providers indicated by markers 502, 503, 505, and 506 within the threshold distance thereof. Additional pre-staging locations not shown in FIG. 8 may be included in geographic area 500 to accommodate, for example, item providers corresponding to markers 501, 504, 507, 507, and 519, as well as item recipients corresponding to markers 523, 524, 525, 526, and 527.

Such proximity between pre-staging locations and item providers may allow the UAVs to consistently respond to item provider requests in under a threshold amount of time (e.g., to guarantee a desired average response time). For example, each of the item providers indicated by markers 512, 513, 514, and 515 may be reachable by UAVs pre-staged at pre-staging location 800 in under 30 seconds. In some embodiments, transport services performed by the pre-staged UAVs may be sold to the item providers at different rates than transport services performed by UAVs dispatched from the UAV nest. That is, item providers may be able to pay a premium for reducing a wait time for a UAV to arrive for payload pick-up. Additionally, in some instances, item providers that pre-order UAVs for transport tasks, and therefore allow the ATSP to more accurately schedule and configured its UAV fleet, may pay a lower rate for pre-staged UAVs that item providers that did not pre-order pre-staged UAVs.

Each UAV may be pre-staged at a corresponding location before the item provider for which the UAV is planned to perform transport tasks is expected to request these transport tasks or has pre-ordered these transport tasks. Thus, for example, a first UAV, planned to serve the item provider indicated by marker 508, may arrive at pre-staging location 802 before $T_8$, a second UAV, planned to serve the item provider indicated by marker 510, may arrive at pre-staging location 802 before $T_{10}$, a third UAV, planned to serve the item provider indicated by marker 511, may arrive at pre-staging location 802 before $T_{11}$, a fourth UAV, planned to serve the item provider indicated by marker 512, may arrive at pre-staging location 802 before $T_{12}$, and a fifth UAV, planned to serve the item recipient indicated by marker 522, may arrive at pre-staging location 802 before $T_{22}$.

The number of UAVs pre-staged at a particular location may depend on an accuracy, reliability, or confidence level of the expected demand level. For example, when the confidence level is low, fewer UAVs than indicated by the expected demand level might actually be pre-staged to avoid having UAVs travel to the pre-staging locations without later being requested by the item providers. For example, some of the pre-staged UAVs may be assigned to serve more than one of the item providers within the threshold distance of the pre-staging location. Alternatively, more UAVs than indicated by the expected demand level might actually be pre-staged to provide redundant capacity in the event of UAV breakdowns or reception of more than the anticipated number of requests.

Pre-staging a UAV for an item provider may involve deploying, from the UAV nest or from another location and to to the pre-staging location, an empty UAV that is not currently carrying a payload item and is thus capable of picking up a payload item from the item provider. On the other hand, pre-staging the UAV for an item recipient may involve deploying, to the pre-staging location, the UAV loaded with a payload item that the item recipient is predicted to order within a future time window. This may involve sending the UAV to an item provider to pick up the payload item predicted to be ordered before deploying the UAV to the pre-staging location. In one example, the ATSP may predict that the item recipient is predicted to order the payload item and, in response, purchase and pick up the payload item from an item provider. The ATSP may then pre-stage the UAV near the item recipient with the purchased payload item, and wait for the item recipient to order the item from the ATSP. Alternatively, the item provider may predict that the item recipient is predicted to order the payload item, and may order from the ATSP a UAV to be pre-staged with the item near the item recipient. In some instances, the ATSP and the item provider may coordinate in other ways to allow for pre-staging of payloads near item recipients in anticipation of the item recipients' orders.

In some embodiments, a UAV dispatched to perform a transport task for an item provider may be one of the UAVs that are within the threshold distance of the item provider. Alternatively, a UAV that is not within the threshold distance of the item provider may be selected to perform the transport task. For example, when there are not any UAVs currently pre-staged within the threshold distance of the item provider, a UAV may be dispatched from a pre-staging location closest to the item provider but that is beyond the threshold distance. Similarly, when a UAV pre-staged beyond the threshold distance of the item provider is better adapted (e.g., is able to carry a heavier payload) to perform the transport task than the UAVs pre-staged within the threshold distance of the item provider, the better-adapted UAV may be dispatched. Further, selection of the UAV for the transport task may be based on a combination of (i) a distance between the pre-staging location and the item pickup location, (ii) a distance between the pickup location and the delivery location, and (iii) a distance between the delivery location and the pre-staging location, a subsequent item provider to which the UAV is dispatched, and/or the UAV nest.

VIII. Example UAV Pre-Configuration Operations

Preparing the UAVs of the UAV nest in anticipation of expected demand may also involve pre-configuring the UAVs before they are dispatched and/or pre-staged throughout geographic area 500. Each UAV may be physically reconfigurable between multiple physical configuration to accommodate different types of payload items. That is, rather than having purpose-built UAVs with fixed, non-reconfigurable components, the ATSP may utilize a fleet of reconfigurable UAVs whose physical capabilities can be adapted to the expected level of demand and the types of payload items expected to be transported.

Figure 9B:
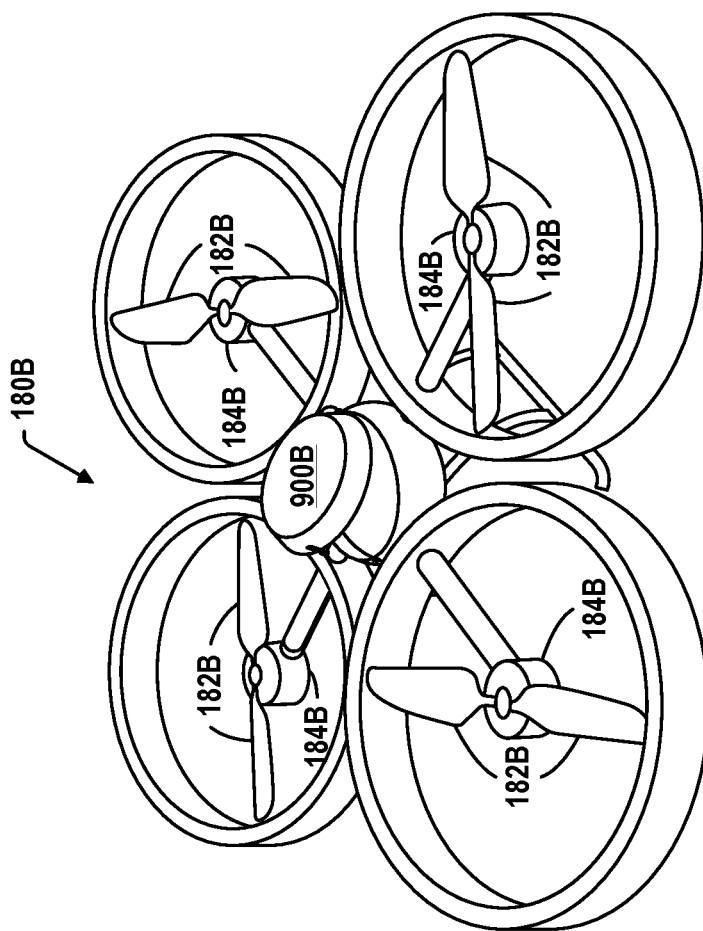
FIG. 9B illustrates a UAV configuration, in accordance with example embodiments.
Figure 9A:
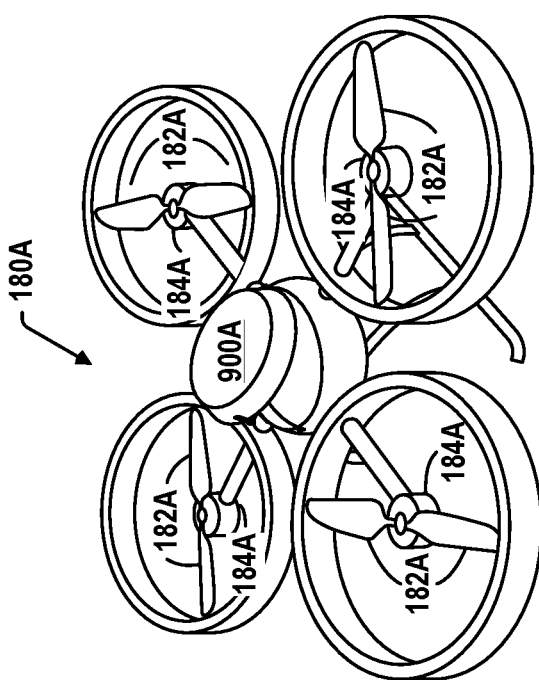
FIG. 9A illustrates a UAV configuration, in accordance with example embodiments.

FIGS. 9A, 9B, 10A, and 10B illustrate example pre-configurations of UAVs based on the types of payload items expected to be transported within geographic area 500. FIG. 9A illustrates UAV configuration 180A which includes body 900A and four rotors 182A and four corresponding motors 184A. Similarly, FIG. 9B illustrates UAV configuration 180B which includes body 900B and four rotors 182B and four corresponding motors 184B. Although bodies 900A and 900B of both UAV configurations 180A and 180B, respectively, have a same size, rotors 182B are larger than rotors 182A and motors 184B are larger and more powerful than motors 184A. Accordingly, by using small rotors 182A and small motors 184A, UAV configuration 180A may be better adapted to transport small payload items over long distances. On the other hand, by using large rotors 182B and large motors 184B, UAV configuration 180B may be better adapted to transport large payload items over short distances.

When the expected level of demand, as shown in FIG. 5, indicates that a first number of item providers are expected to request UAVs for transport of small payloads (e.g., payloads under a threshold weight or volume), a first number of UAVs from the UAV nest may be reconfigured according to UAV configuration 180A. Similarly, when the expected level of demand indicates that a second number of item providers are expected to request UAVs for transport of large payloads (e.g., payloads over the threshold weight or volume), a second number of UAVs from the UAV nest may be reconfigured according to UAV configuration 180B. Any remaining UAVs may be reconfigured to use yet different rotors and motors that may, for example, provide a balance between payload carrying capacity and energy expenditure. Nevertheless, the types of payload items that item providers are expected to have transported and item recipients are expected to receive may determine the physical configurations of the UAVs dispatched to complete these transport tasks.

Figures 10A, 10B:
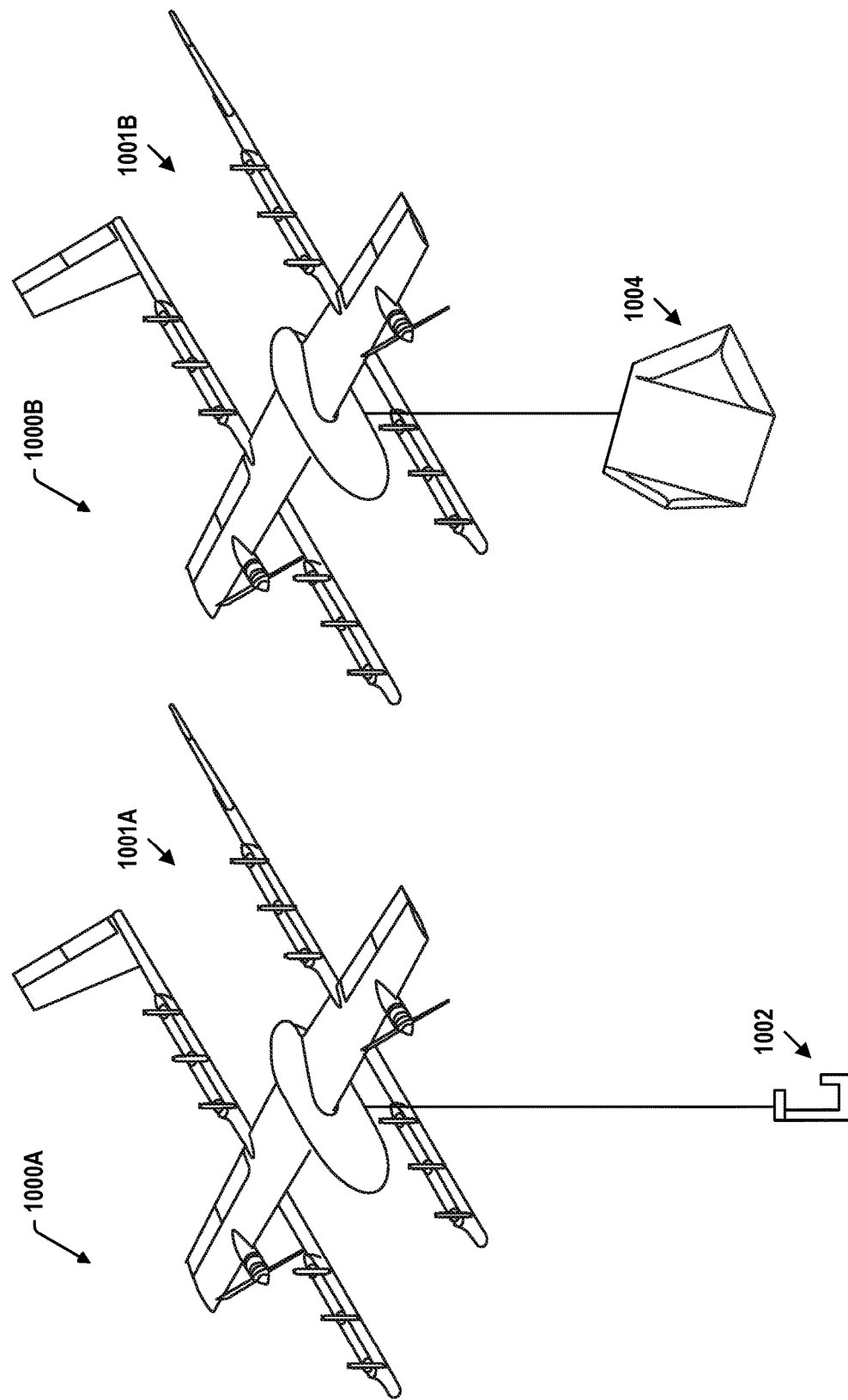
FIG. 10A illustrates a UAV configuration, in accordance with example embodiments.
FIG. 10B illustrates a UAV configuration, in accordance with example embodiments.

FIG. 10A illustrates UAV configuration 1000A which includes payload hook 1002 connected to UAV 1001A. Similarly, FIG. 10B illustrates UAV configuration 1000B which includes an insulated container 1004 connected to UAV 1001B. Although UAVs 1001A and 1001B of both UAV configurations 1000A and 1000B, respectively, may be similarly or identically configured, UAV configurations 1000A and 1000B differ in the types of payload items they are capable of picking up and transporting using hook 1002 and insulated container 1004. By using hook 1002, UAV configuration 1000A may be generally adapted to transport a wide range of payloads. On the other hand, by using insulated container 1004, UAV configuration 1000B may be specifically adapted to transport temperature-sensitive payloads such as food items, chemicals, or biological samples, among other possibilities.

When the expected level of demand indicates that a first number of item providers are expected to request UAVs for transport of food items (e.g., around lunch or dinner time), a first number of UAVs from the UAV nest may be reconfigured according to UAV configuration 1000B. Any remaining UAVs may be reconfigured according to UAV configuration 1000A, or another UAV configuration with a yet different type of payload coupling apparatus, to prepare for performance of other tasks in the geographic area. Again, the demand for various types of transport tasks may drive the physical configurations of the UAVs dispatched to complete these transport tasks.

Additional UAV configurations may be possible. That is, each of a number of swappable UAV components may be selected to prepare or optimize the UAV for a particular task. For example, a UAV expected to transport a catering food order may be pre-configured according to a UAV configuration that includes large rotors 182B and large motors 184B as well as a plurality of insulated containers 1004 (or one larger insulated container). In some implementations, a UAV may be pre-configured for a series of transport tasks which it is expected to perform. That is, rather than being adapted to transport one particular type of payload item, the UAV may be pre-configured to handle a range of possible types of payload items. For example, the UAV may be configured with motors and rotors sufficient to lift a heaviest of the range of payload items.

IX. Additional Example Operations

Figure 11:
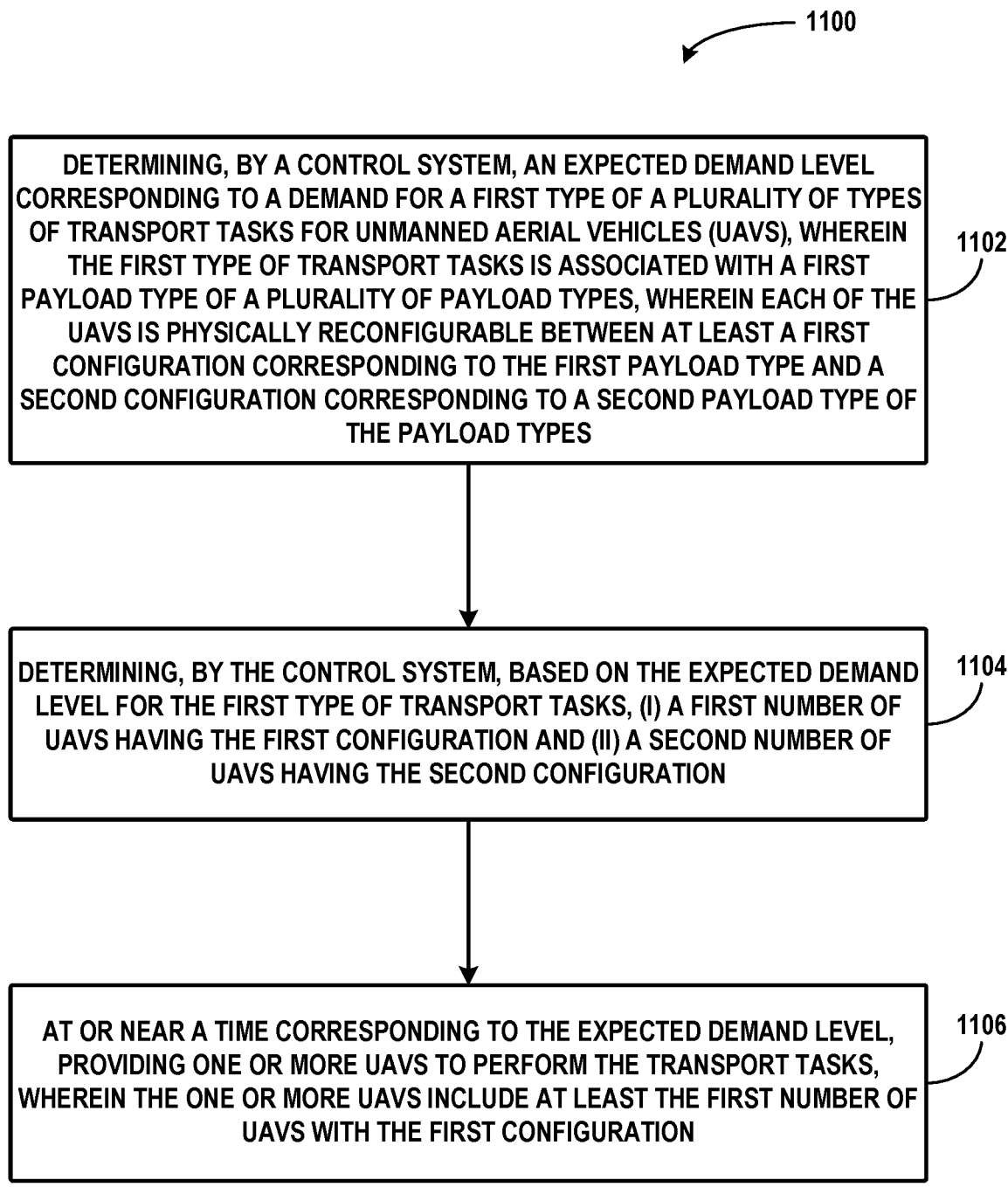
FIG. 11 illustrates a flow chart, in accordance with example embodiments.

FIG. 11 illustrates flowchart 1100 of example operations related to dispatch of UAVs based on expected demand levels. These operations may be executed by UAV 200, system 300, ATSP control system 401, or one or more other computing devices or systems herein discussed.

Block 1102 may involve determining, by a control system, an expected demand level corresponding to a demand for a first type of a plurality of types of transport tasks for unmanned aerial vehicles (UAVs). The first type of transport tasks may be associated with a first payload type of a plurality of payload types. Each of the UAVs may be physically reconfigurable between at least a first configuration corresponding to the first payload type and a second configuration corresponding to a second payload type of the payload types.

The UAVs may be operated by an aerial transport service provider (ATSP). The ATSP may house the UAVs at a UAV nest which may serve a plurality of item providers within a geographic area. The location of the UAV nest may be different from locations of the item providers (e.g., the ATSP and the item providers may be separate entities).

Block 1104 may involve determining, by the control system, based on the expected demand level for the first type of transport tasks, (i) a first number of UAVs having the first configuration and (ii) a second number of UAVs having the second configuration.

Block 1106 may involve, at or near a time corresponding to the expected demand level, providing one or more UAVs to perform the transport tasks. The one or more UAVs may include at least the first number of UAVs with the first configuration.

In some embodiments, the one or more UAVs may also include the second number of UAVs with the second configuration.

In some embodiments providing the one or more UAVs to perform the transport tasks may include, before the time corresponding to the expected demand level, dispatching the one or more UAVs to a plurality of pre-staging locations distributed throughout a geographic area to which the expected demand level corresponds. Each of the plurality of pre-staging locations may be configured to have at least one UAV land thereon. In response to receiving requests for the first type of transport tasks, the UAVs with the first configuration may be dispatched from the plurality of pre-staging locations to perform the requested transport tasks of the first type.

In some embodiments, the plurality of pre-staging locations may include landing structures distributed throughout the geographic area.

In some embodiments, the plurality of pre-staging locations may include features of an environment within the geographic area.

In some embodiments, the plurality of pre-staging locations to which to dispatch the one or more UAVs may be determined based on the expected demand level.

In some embodiments, payload items of the plurality of payload types may be provided by item providers in the geographic area. An aerial transport service provider (ATSP) may operate the UAVs. The ATSP may house the UAVs at a UAV nest location different from locations of the item providers. At least one pre-staging location of the plurality of pre-staging locations may be within a threshold distance of at least one of the item providers.

In some embodiments, payload items of the plurality of payload types may be provided by item providers. An aerial transport service provider (ATSP) may operate the UAVs. The ATSP may house the UAVs at a UAV nest location different from locations of the item providers. The expected demand level for the first type of transport tasks may indicate expected times at which the first type of transport tasks are predicted to be requested by the item providers. Based on distances between the UAV nest location and the locations of the item providers, transit times between the UAV nest location and the locations of the item providers may be determined. Based on the transit times, the one or more UAVs may be dispatched from the UAV nest location to arrive at the locations of the item providers at or before the expected times.

In some embodiments, payload items of the plurality of payload types may be provided by item providers in a geographic area. A first payload item of the first payload type may be received from a first item provider of the item providers in the geographic area and by a first UAV of the first number of UAVs with the first configuration. A destination for the first payload item may be received from the first item provider. The first UAV may be caused to transport the first payload item from a location of the first item provider to the destination. The destination for the first payload item may be received from the first item provider before the first UAV is dispatched from the UAV nest, before the first UAV is dispatched from a pre-staging location, while the first UAV is in transit from the UAV nest to the pre-staging location or from the pre-staging location to the first item provider, or after the first UAV picks up the first payload item from the first item provider.

In some embodiments, the expected demand level for the first type of transport tasks indicates (i) source locations from which to pick up payload items of the first payload type and (ii) expected times at which the first type of transport tasks are predicted to be requested.

In some embodiments, the expected demand level for the first type of transport tasks indicates (i) destinations to which to deliver payload items of the first payload type and, (ii) expected times at which delivery of the payload items of the first payload type is predicted to be requested. Providing the one or more UAVs to perform the transport tasks may involve dispatching, based on the expected times, the first number of UAVs carrying payload items of the first type to the destinations.

In some embodiments, each of the first number of UAVs having the first configuration may be configured to transport payload items of the first payload type.

In some embodiments, the first number of UAVs may be configured to have the first configuration by swapping one or more components of the first number of UAVs for components of a first type. The second number of UAVs may be configured to have the second configuration by swapping one or more components of the second number of UAVs for components of a second type. The one or more UAVs provided to perform the transport tasks may additionally include at least the second number of UAVs with the second configuration.

In some embodiments, configuring the first number of UAVs to have the first configuration may include configuring the first number of UAVs with a first type of payload container configured to carry payload items of the first payload type. Configuring the second number of UAVs to have the second configuration includes configuring the second number of UAVs with a second type of payload container configured to carry payload items of a second payload type of the plurality of payload types. The second payload type may be different from the first payload type.

In some embodiments, payload items of the first payload type may include food items. The first type of payload container may include an insulated cavity configured to receive the food items.

In some embodiments, the expected demand level may be a first expected demand level. A second expected demand level for second type of transport tasks of the plurality of types of transport tasks may be determined for a geographic area to which the first expected demand level corresponds. The second type of transport tasks may be associated with a second payload type of the plurality of payload types. The first number of UAVs having the first configuration and the second number of UAVs having the second configuration may be determined further based on the second expected demand level for the second type of transport tasks. The one or more UAVs provided to perform the transport tasks may additionally include at least the second number of UAVs with the second configuration.

In some embodiments, the first number of UAVs having the first configuration and the second number of UAVs having the second configuration may each include zero or more UAVs.

Figure 12:
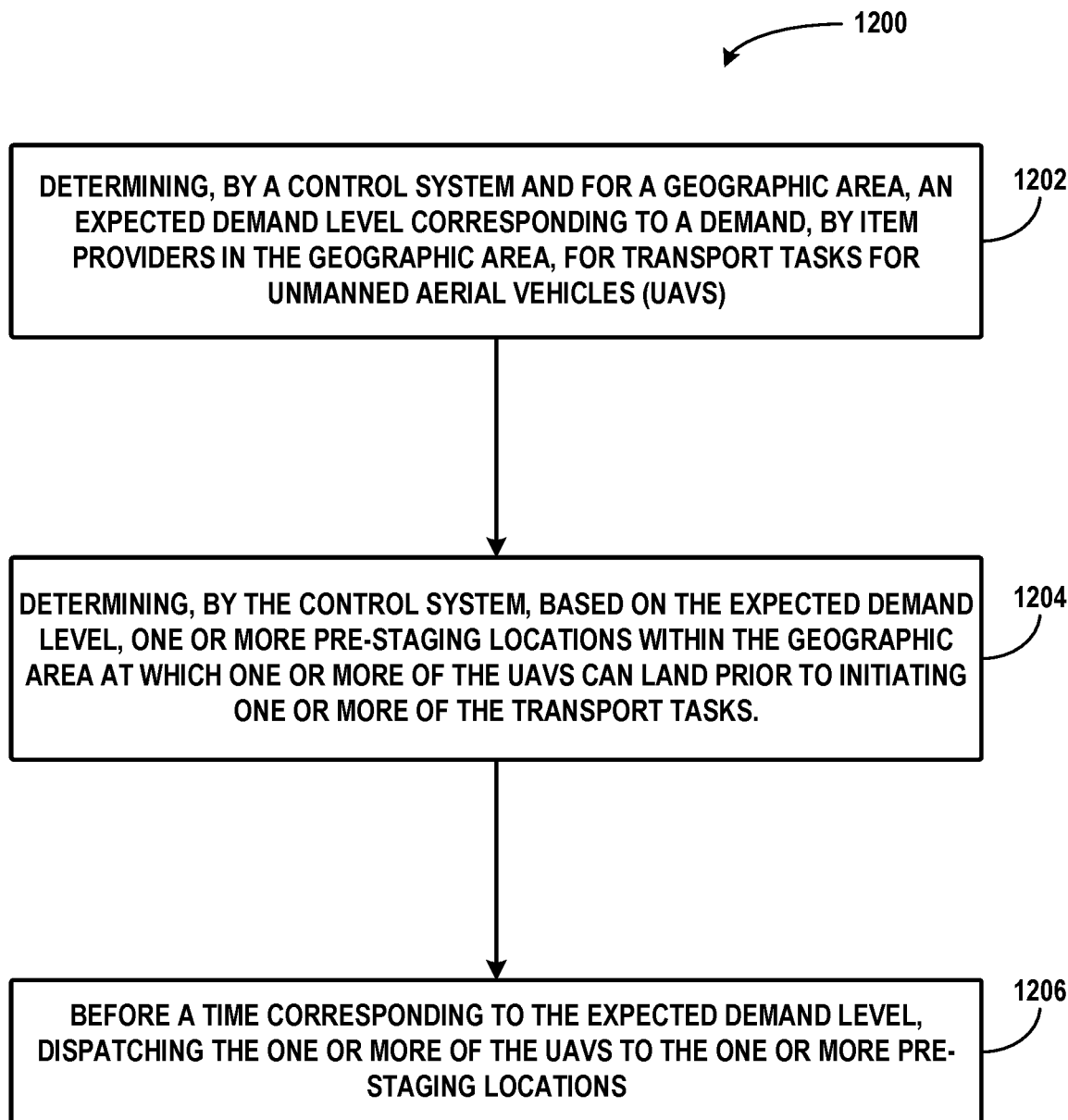
FIG. 12 illustrates a flow chart, in accordance with example embodiments.

FIG. 12 illustrates flowchart 1200 of example operations related to dispatch of UAVs based on expected demand levels. These operations may be executed by UAV 200, system 300, ATSP control system 401, or one or more other computing devices or systems herein discussed.

Block 1202 may involve determining, by a control system and for a geographic area, an expected demand level corresponding to a demand, by item providers in the geographic area, for transport tasks for unmanned aerial vehicles (UAVs).

Block 1204 may involve determining, by the control system, based on the expected demand level, one or more pre-staging locations within the geographic area at which one or more of the UAVs can land prior to initiating one or more of the transport tasks.

Block 1206 may involve, before a time corresponding to the expected demand level, dispatching the one or more of the UAVs to the one or more pre-staging locations.

In some embodiments, an aerial transport service provider (ATSP) may operate the UAVs. The ATSP may house the UAVs at a UAV nest location different from locations of the item providers. Dispatching the one or more UAVs to the one or more pre-staging locations may involve dispatching the UAVs from the UAV nest location to the one or more pre-staging locations.

In some embodiments, the expected demand level may indicate a distribution of item providers in the geographic area expected to request the transport tasks. At least one pre-staging location of the one or more pre-staging locations may be within a threshold distance of at least one of the item providers within the geographic area.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A non-transitory computer-readable storage medium having stored thereon instructions that, when executed by a computing device, cause the computing device to perform operations comprising:
    determining, for a geographic area, an expected demand level corresponding to a demand, by item providers in the geographic area, for transport tasks for unmanned aerial vehicles (UAVs), wherein an aerial transport service provider (ATSP) operates the UAVs, and wherein the ATSP houses the UAVs at a particular location different from locations of the item providers;
    determining, based on the expected demand level, one or more pre-staging locations within the geographic area at which one or more UAVs of the UAVs can land prior to initiating one or more of the transport tasks; and
    before a time corresponding to the expected demand level, dispatching the one or more UAVs from the particular location to the one or more pre-staging locations.

2. The non-transitory computer-readable storage medium of claim 1, wherein the expected demand level indicates a distribution of the item providers in the geographic area.

3. The non-transitory computer-readable storage medium of claim 1, wherein the expected demand level indicates (i) source locations from which the item providers are predicted to request pick up of payload items associated with the transport tasks and (ii) expected times at which the transport tasks are predicted to be requested.

4. The non-transitory computer-readable storage medium of claim 1, wherein the expected demand level comprises: (i) a first demand level associated with a first subset of a plurality of item recipients expected to request, from a first subset of the item providers, at least a first subset of the transport tasks, and (iii) a second demand level associated with a second subset of the plurality of item recipients expected to request, from the ATSP, at least a second subset of the transport tasks associated with a second subset of the item providers.

5. The non-transitory computer-readable storage medium of claim 1, wherein the expected demand level indicates expected times at which the transport tasks are predicted to be requested, and wherein the operations further comprise:
    determining, based on distances between the particular location and the one or more pre- staging locations, transit times between the particular location and the one or more pre-staging locations; and
    dispatching, based on the transit times, the one or more UAVs from the particular location such that each respective UAV of the one or more UAVs arrives at a corresponding pre- staging location of the pre-staging locations at or before a corresponding expected time of the expected times.

6. The non-transitory computer-readable storage medium of claim 1, wherein the operations further comprise:
    receiving a request for a first transport task of the transport tasks, wherein the first transport task is associated with a first item provider of the item providers in the geographic area and a first item recipient in the geographic area; and
    based on receiving the request for the first transport task, dispatching a first UAV of the one or more UAVs from a corresponding pre-staging location of the one or more pre-staging locations to perform the first transport task.

7. The non-transitory computer-readable storage medium of claim 6, wherein the request for the first transport task is received from at least one of: (i) the first item provider, or (ii) the first item recipient.

8. The non-transitory computer-readable storage medium of claim 6, wherein the operations further comprise:
    receiving, from the first item provider and by the first UAV, a payload item;
    determining, based on the request for the first transport task, a destination for the payload item; and
    causing the first UAV to transport the payload item to the destination.

9. The non-transitory computer-readable storage medium of claim 1, wherein at least one pre-staging location of the one or more pre-staging locations is within a threshold distance of at least one item provider of the item providers.

10. The non-transitory computer-readable storage medium of claim 1, wherein the one or more pre-staging locations comprise one or more landing structures distributed throughout the geographic area.

11. The non-transitory computer-readable storage medium of claim 1, wherein the one or more pre-staging locations comprise one or more features of an environment within the geographic area.

12. The non-transitory computer-readable storage medium of claim 1, wherein the particular location is a UAV nest location.

13. A system comprising:
    unmanned aerial vehicles (UAVs) operated by an aerial transport service provider (ATSP);
    a particular location operated by the ATSP and configured to house the UAVs;
    a control system comprising a processor and a non-transitory computer-readable storage medium having stored thereon instructions that, when executed by the processor, cause the processor to perform operations comprising:
- determining, for a geographic area, an expected demand level corresponding to a demand, by item providers in the geographic area, for transport tasks for the UAVs, wherein the particular location is different from locations of the item providers;
- determining, based on the expected demand level, one or more pre-staging locations within the geographic area at which one or more UAVs of the UAVs can land prior to initiating one or more of the transport tasks; and
- before a time corresponding to the expected demand level, dispatching the one or more UAVs from the particular location to the one or more pre-staging locations.

14. The system of claim 13, wherein the expected demand level indicates expected times at which the transport tasks are predicted to be requested, and wherein the operations further comprise:
- determining, based on distances between the particular location and the one or more pre- staging locations, transit times between the particular location and the one or more pre-staging locations; and
- dispatching, based on the transit times, the one or more UAVs from the particular location such that each respective UAV of the one or more UAVs arrives at a corresponding pre- staging location of the pre-staging locations at or before a corresponding expected time of the expected times.

15. The system of claim 13, wherein the operations further comprise:
- receiving requests for the transport tasks; and
- based on receiving the requests for the transport tasks, dispatching the one or more UAVs from the one or more pre-staging locations to perform the requested transport tasks.

16. The system of claim 13, wherein at least one pre-staging location of the one or more pre-staging locations is within a threshold distance of at least one item provider of the item providers.

17. The system of claim 13, wherein the one or more pre-staging locations comprise one or more landing structures distributed throughout the geographic area.

18. A system comprising:
- unmanned aerial vehicles (UAVs), wherein each of the UAVs is physically reconfigurable between at least a first configuration corresponding to a first payload type of a plurality of payload types and a second configuration corresponding to a second payload type of the plurality of payload types; and
- a control system comprising a processor and a non-transitory computer-readable storage medium having stored thereon instructions that, when executed by the processor, cause the processor to perform operations comprising:
  - determining an expected demand level corresponding to a demand for a first type of transport tasks of a plurality of types of transport tasks for the UAVs, wherein the first type of transport tasks is associated with the first payload type;
  - determining, based on the expected demand level for the first type of transport tasks, (i) a first number of UAVs having the first configuration and (ii) a second number of UAVs having the second configuration;
  - before a time corresponding to the expected demand level, dispatching one or more UAVs to a plurality of pre-staging locations distributed throughout a geographic area to which the expected demand level corresponds, wherein the one or more UAVs include at least the first number of UAVs with the first configuration, and wherein each of the plurality of pre-staging locations accommodates landing of at least one UAV thereon; and
  - in response to receiving requests for the first type of transport tasks, dispatching the UAVs with the first configuration from the plurality of pre-staging locations to perform the requested transport tasks of the first type.

19. The system of claim 18, wherein payload items of the plurality of payload types are provided by item providers in the geographic area, and wherein the system further comprises:
- a UAV nest location operated by an aerial transport service provider (ATSP) and configured to house the UAVs, wherein the particular location is different from locations of the item providers.

20. The system of claim 18, wherein the operations further comprise:
- causing the first number of UAVs to be modified to have the first configuration by swapping one or more components of the first number of UAVs for components of a first type; and
- causing the second number of UAVs to be modified to have the second configuration by swapping one or more components of the second number of UAVs for components of a second type, wherein the one or more UAVs dispatched to the plurality of pre-staging locations additionally comprise at least the second number of UAVs with the second configuration.

* * * * *